(12) United States Patent
Kobayashi et al.

(10) Patent No.: US 6,889,736 B2
(45) Date of Patent: May 10, 2005

(54) RUN FLAT PNEUMATIC TIRE WITH SHOULDER CUSHION RUBBER LAYER LOSS TANGENT LESS THAN CARCASS COATING RUBBER LOSS TANGENT

(75) Inventors: Kazuomi Kobayashi, Higashimurayama (JP); Tomohisa Nishikawa, Kodaira (JP); Kenji Matsuo, Kodaira (JP); Hiroki Sawada, Kodaira (JP)

(73) Assignee: Bridgestone Corporation, Tokyo (JP)

(*) Notice: Subject to any disclaimer, the term of this patent is extended or adjusted under 35 U.S.C. 154(b) by 119 days.

(21) Appl. No.: 10/463,479

(22) Filed: Jun. 18, 2003

(65) Prior Publication Data

US 2003/0213542 A1 Nov. 20, 2003

Related U.S. Application Data

(62) Division of application No. 09/622,445, filed as application No. PCT/JP99/06023 on Oct. 29, 1999, now Pat. No. 6,619,354.

(30) Foreign Application Priority Data

Dec. 17, 1998 (JP) ............................................ 10-358718
Mar. 8, 1999 (JP) .............................................. 11-60268

(51) Int. Cl.⁷ ........................... B60C 17/00; B60C 9/02; B60C 9/18
(52) U.S. Cl. ...................... 152/517; 152/532; 152/550; 152/556; 152/564
(58) Field of Search ................................ 152/517, 532, 152/550, 556, 564

(56) References Cited

U.S. PATENT DOCUMENTS

| | | |
|---|---|---|
| 4,067,372 A | 1/1978 | Masson |
| 5,217,549 A | 6/1993 | Johnson |
| 5,368,082 A | 11/1994 | Oare et al. |
| 5,795,416 A | 8/1998 | Willard, Jr. et al. |
| 5,871,600 A | 2/1999 | Oare et al. |
| 6,026,878 A | 2/2000 | Zhang et al. |
| 6,230,773 B1 | 5/2001 | Sandstrom et al. |

FOREIGN PATENT DOCUMENTS

| | | |
|---|---|---|
| EP | 0 456 737 A2 | 11/1991 |
| EP | 0 787 603 A2 | 8/1997 |
| EP | 0 822 105 A2 | 2/1998 |
| JP | 45-40483 B | 12/1970 |
| JP | 49-70303 A | 7/1974 |
| JP | 49-116702 A | 11/1974 |
| JP | 50-12921 B | 5/1975 |
| JP | 50-59902 A | 5/1975 |
| JP | 50-60905 A | 5/1975 |
| JP | 50-60906 A | 5/1975 |
| JP | 50-60907 A | 5/1975 |
| JP | 50-78003 A | 6/1975 |
| JP | 50-111704 A | 9/1975 |
| JP | 50-121902 A | 9/1975 |
| JP | 50-138502 A | 11/1975 |
| JP | 51-20301 A | 2/1976 |
| JP | 51-64203 A | 6/1976 |
| JP | 51-69804 A | 6/1976 |
| JP | 56-143102 U | 10/1981 |
| JP | 2-64405 U | 5/1990 |
| JP | 2-64406 U | 5/1990 |
| JP | 4-11842 Y2 | 3/1992 |
| JP | 5-104915 A | 4/1993 |
| JP | 06-48125 A | 2/1994 |
| JP | 06-270617 A | 9/1994 |

Primary Examiner—Adrienne C. Johnstone
(74) Attorney, Agent, or Firm—Sughrue Mion, PLLC

(57) ABSTRACT

There is provided a pneumatic tire having an aspect ratio of not less than 60 and considerably improving run flat durability as compared with the conventional type of the run flat tire, wherein at least one cushion rubber layer having a loss tangent lower than a loss tangent (tan δ) of a coating rubber for cords of a carcass ply is arranged between an end portion of a belt and a reinforcing rubber layer in a shoulder region and between mutually adjacent tire constitutional members. And also, when the carcass is comprised of plural plies, at least one ply is separated off in a zone beneath the belt, whereby the ride comfort against vibrations can be more improved.

13 Claims, 21 Drawing Sheets

Run flat durability

Run flat durability

RUN FLAT PNEUMATIC TIRE WITH SHOULDER CUSHION RUBBER LAYER LOSS TANGENT LESS THAN CARCASS COATING RUBBER LOSS TANGENT

This is a divisional of application Ser. No. 09/622,445 filed Aug. 17, 2000, now U.S. Pat. No. 6,619,354 B1 issued Sep. 16, 2003, which is a National Stage Application filed under §371 of PCT Application No. PCT/JP99/06023 filed Oct. 29, 1999; the above noted prior applications are all hereby incorporated by reference.

TECHNICAL FIELD

This invention relates to a pneumatic tire, and more particularly to a radial tire of so-called run flat type capable of running over a given distance at a state that an internal pressure becomes zero or is rendered into a slight pressure due to puncture or the like. Especially, it relates to a pneumatic tire having an excellent durability of run flat state (running at puncture state) for use in passenger cars, light trucks and small size trucks wherein a ratio of section height to section width (aspect ratio) is as relatively large as not less than 60.

BACKGROUND ART

Radial tires of run flat type (hereinafter referred to as a run flat tire) are mainly used in vehicles wherein a load applied to the tire is relatively small such as passenger cars, light trucks, small size trucks and the like. In the run flat tire, it is required that when the tire is rendered into a flat state through puncture during not only the running on general-purpose roads but also the high-speed running on express ways, it is possible to safely and surely run the tire up to a site capable of conducting tire exchange over a given distance, for example, not less than 300 km without damaging the steering stability of the vehicle, particularly passenger car and causing the separation off from a rim or the breakage of the tire.

For this end, run flat tires having various structures are proposed sometimes in a combination with a fully worked-out rim to be used. These proposed tires are roughly divided into super low section profile tires having an aspect ratio of less than 60 and tires having a relatively high section height corresponding to an aspect ratio of not less than 60.

The run flat tires mostly and practically used in markets among the above super low section profile tires are disclosed, for example, in JP-B-45-40483, JP-B-50-12921, JP-A-49, 70303, JP-A-49-116702, JP-A-50-59902, JP-A-50-60905, JP-A-50-60906, JP-A-50-60907, JP-A-50-78003, JP-A-50-111704, JP-A-50-121902, JP-A-50-138502, JP-A-51-20301, JP-A-51-64203 and JP-A-51-69804.

Giving an example of the tires disclosed in the above publications, as shown in FIG. 7, a tire 20 has a structure that a pair of thick reinforcing rubber layers 9 having a crescent shape at section are arranged at an inner face side of an innermost carcass ply 6-1 in a radial carcass 6 extending from a bead portion 2 through a sidewall portion 3 to a tread portion 4. However, this type of the tire is unavoidable in a point that the cost becomes higher and is frequently mounted onto an expensive grade of a vehicle supposing the high-speed running such as sport car, sport-type car or the like.

In the tire 20 having the thick reinforcing rubber layer 9, in order to mitigate the degree of crushed deformation during the running at run flat state under loading (hereinafter referred to as run flat running or running under low internal pressure) as far as possible, the radial carcass 6 has a two or more ply structure comprising a turnup ply 6-1 wound around a bead core 5 from an inside of the tire toward an outside thereof and a down ply 6-2 enveloping the turnup ply 6-1 from an outside thereof, and a hard stiffener rubber 8 extending from an outer peripheral face of the bead core 5 near to a position of a tire maximum width is disposed between the turnup ply 6-1 and the down ply 6-2, and a rubberized Kevlar cord or steel cord layer (a layer called as an insert ply) is arranged so as to extend from the bead portion 2 to the sidewall portion 3, if necessary.

On the other hand, the tires having the relatively high section height are frequently used in not only high-grade imported passenger cars and high-grade domestic passenger cars having a relatively large displacement but also light trucks and small size trucks. This type of the tire is possible to run at run flat state in cooperation with a rim fitted thereto, wherein a type of incorporating a protection member (core) for pushing the bead portion toward a rim flange into the rim is the main current as disclosed in JP-U-56-143102, JP-Y-4-11842, JP-U-2-64405, JP-U-2-64406, JP-A-5-104915, JP-A-6-48125 and JP-A-6-270617.

In the tire having the structure shown in FIG. 7, it is proposed and practiced to increase the thickness or height of the stiffener rubber 8 and the reinforcing rubber layer 9, or largely increase the hardness and modulus of rubbers 8, 9 themselves for improving the durability in the run flat running. These improving means are proposed under an intention that region $\alpha$ in the vicinity of the bead portion 2 and region $\beta$ of the sidewall portion 3 being trouble region in the run flat running as shown in FIG. 8 are reinforced and at the same time the reinforcing balance of both regions $\alpha,\beta$ is optimized to reduce strain at the region $\alpha$ and strain at the region $\beta$ together.

However, as the reinforcing degree of each of the stiffener rubber 8 and the reinforcing rubber layer 9 increases, the occurrence of troubles in the region $\alpha$ and the occurrence of troubles in the region $\beta$ as a tire trouble in the run flat running can be avoided, while the trouble site merely and rapidly shifts to a region $\gamma$ of a shoulder portion including an end portion of a belt 7 and an end portion of the reinforcing rubber layer 9 as shown in FIG. 7. Finally, the thus improved conventional run flat tire can not attain the run flat runnable distance of not less than 300 km and support the high-speed running on the expressway as user's demand. Therefore, it is still desired to develop tires having a run flat durability capable of running over not less than 300 km and supporting the high-speed running on the expressway.

And also, the means of incorporating the core into the rim has a problem firstly in the rim assembling property because the assembling of the tire onto a wheel is not easy. Further, the big rise of weight in the tire and in the tire-wheel assembly is unavoidable and also unspring weight of the vehicle is largely increased to considerably damage the ride comfort of the vehicle against vibrations. That is, there is a problem that these inconveniences become unsuitable in not only the high grade passenger cars but also the light tuck and small-size truck.

It is, therefore, an object of the invention to provide a pneumatic tire particularly having an aspect ratio of not less than 60 which can hold a good rim assembling property without causing weight increase in tire-rim assembly and remarkable cost rise, guarantee the safe high-speed running of a vehicle such as passenger car, light truck, small size truck or the like even if rapid air leakage is caused by puncture or the like, and develop the performance of preventing separation off of the tire from the rim during the run flat running over not less than 300 km and the durability performance.

It is another object of the invention to provide a pneumatic tire having an aspect ratio of not less than 60 and an excellent ride comfort against vibrations during the run flat running, particularly a run flat tire for passenger car.

DISCLOSURE OF INVENTION

In order to achieve the above objects, the invention lies in a pneumatic tire comprising a carcass of one or more rubberized plies of radially arranged cords toroidally extending between a pair of bead cores embedded in respective bead portions and reinforcing a pair of sidewall portions and a tread portion, a belt of two or more steel cord cross layers disposed on an outer periphery of the carcass to reinforce the tread portion, and a reinforcing rubber layer arranged in at least a part of a zone ranging from a position near to the bead portion through the sidewall portion to a shoulder region of the tread portion, characterized in that the belt has end portions at both shoulder regions of the tread portion;

at least one cushion rubber layer is provided between the end portion of the belt and the reinforcing rubber layer in the shoulder region and between mutually adjacent tire constitutional members; and the cushion rubber layer has a loss tangent lower than a loss tangent (tan δ) of rubber for coating cords of the carcass ply.

The term "shoulder region of tread portion" used herein is defined by a region enclosed between a vertical line drawn to an inner face of an innermost carcass ply through a ground contact end and a vertical line drawn to the inner face of the innermost carcass ply through a position separated by ⅛ width from the ground contact end toward a central side of a ground contact area when a ground contact width of the tread portion is divided into eight equal parts at a section of the tire when a tire-rim assembly formed by assembling the tire onto an approved rim is inflated under a slight pressure corresponding to 10% of a maximum air pressure (defined according to JATMA, TRA or ETORTO standard of 1998). Moreover, when the tire has a round shoulder, the ground contact end is an intersect between extension lines of two curved lines or between extension lines of one curved line and one straight line connecting to each end of an arc forming the round.

And also, the term "loss tangent (tan δ)" used herein is a value measured at a testing temperature of 25° C. according to (1) "Case through loading waveform, deflection waveform" among non-resonant methods described in "Testing methods for dynamic properties of cured rubber" of JIS K 6394-1995 when a kind of deformation is tension.

In a preferable embodiment of the invention, the cushion rubber layer is arranged between mutually adjacent end portions of the two steel cord cross layers constituting the belt, between the outermost carcass ply and an end portion of a steel cord layer nearest to the ply, between adjacent carcass plies in the carcass comprised of two or more plies, or between the innermost carcass ply and the reinforcing rubber layer.

In case of being arranged between the end portions of the steel cord cross layers, the cushion rubber layer has a width within a range of 10~30 mm and is favorable to dividedly arrange the cushion rubber layer at an equal width on both sides with respect to a vertical line $VL_1$ drawn to the outermost carcass ply through an end of a narrow-width steel cord layer. This is a case that the mutually adjacent two steel cord cross layers have different widths. If the widths of the cross layers are the same, the vertical line $VL_1$ may be a vertical line passing through any end of the steel cord layers.

In this case, it is favorable that a distance $d_1$ between adjacent steel cords at the ends of the steel cord cross layers as measured on the vertical line $VL_1$ is within a range of 0.5~2.0 mm through the cushion rubber layer.

In case of being arranged between the outermost carcass ply and the end portion of the steel cord layer, the cushion rubber layer has a width of 10=40 mm and is favorable to dividedly arrange the cushion rubber layer at an equal width on both sides with respect to a vertical line $VL_2$ drawn to the inner face of the innermost carcass ply through an end of an innermost steel cord layer constituting the belt.

In this case, it is favorable that a distance $d_2$ between cord of the outermost carcass ply and steel cord of the belt layer nearest to such a ply as measured on the vertical line $VL_2$ is within a range of 0.5~6.0 mm through the cushion rubber layer.

In case of being arranged between the carcass plies, the cushion rubber layer has a width of 10~30 mm and is favorable to dividedly arrange the cushion rubber layer at an equal width on both sides with respect to the vertical line $VL_2$.

In this case, it is favorable that a distance $d_3$ between cords of the adjacent carcass plies as measured on the vertical line $VL_2$ is within a range of 0.5~2.0 mm through the cushion rubber layer.

In case of being arranged between the innermost carcass ply and the reinforcing rubber layer, the cushion rubber layer has a width of 10~40 mm and is favorable to dividedly arrange the cushion rubber layer at an equal width on both sides with respect to the vertical line $VL_2$.

In this case, it is favorable that a distance $d_4$ from the cord of the innermost carcass ply to the reinforcing rubber layer as measured on the vertical line $VL_2$ is within a range of 0.5~3.0 mm through the cushion rubber layer.

Moreover, it is preferable to arrange the cushion rubber layer in at least two arrangement positions selected from the above four arrangement positions.

The loss tangent of the cushion rubber layer is within a range of 0.02~0.10 under test conditions that a temperature is 25° C., an initial tensile load is 160 gf, a dynamic strain is 1.0% and a frequency is 52 Hz. Moreover, the method of measuring the loss tangent is as previously mentioned. However, dimensions of a rubber sample applied to the test of loss tangent are 2 mm in thickness, 5 mm in width and 20 mm in length.

In another preferable embodiment of the invention, the cord of the carcass is an organic fiber cord. When the carcass is comprised of two or more plies, at least one ply contains cords of an organic fiber selected from rayon fiber, aromatic polyamide fiber, aliphatic polyamide fiber having a melting point of not lower than 250° C. as measured through differential scanning calorimetry (DSC) and polyester fiber.

And also, in the carcass comprised of 2 or more plies, at least one ply is favorable to be a split ply separated off in a zone beneath the belt. The split ply is the turnup ply or the down ply and is favorable to have a split-off width corresponding to at least 20% of a belt width. Furthermore, at least one ply of the split plies is favorable to contain cords of an organic fiber selected from rayon fiber, aromatic polyamide fiber, aliphatic polyamide fiber having a melting point of not lower than 250° C. as measured through DSC and polyester fiber.

As the aliphatic polyamide, nylon-66 or nylon-46 is preferable. As the polyester, polyethylene terephthalate (PET) and polyethylene-2,6-naphthalate (PEN) are preferable.

Further, the invention lies in a pneumatic tire for passenger car comprising a pair of ring-shaped bead cores, a carcass comprised of at least two rubberized plies of radially arranged cords toroidally extending between the bead cores to reinforce a pair of sidewall portions and a tread portion, at least one ply of which plies containing cords of an organic fiber selected from rayon fiber, aromatic polyamide fiber, aliphatic polyamide fiber having a melting point of not lower than 250° C. as measured through DSC and polyester fiber, a belt arranged on an outer periphery of the carcass to reinforce the tread portion and comprised of two or more steel cord cross layers, and a reinforcing rubber layer arranged in at least a part of a zone ranging from a position near to the bead portion through the sidewall portion to a shoulder region of the tread portion, characterized in that at least one ply of the carcass is a split ply separated off in a zone beneath the belt.

BEST MODE FOR CARRYING OUT THE INVENTION

Figure 1:
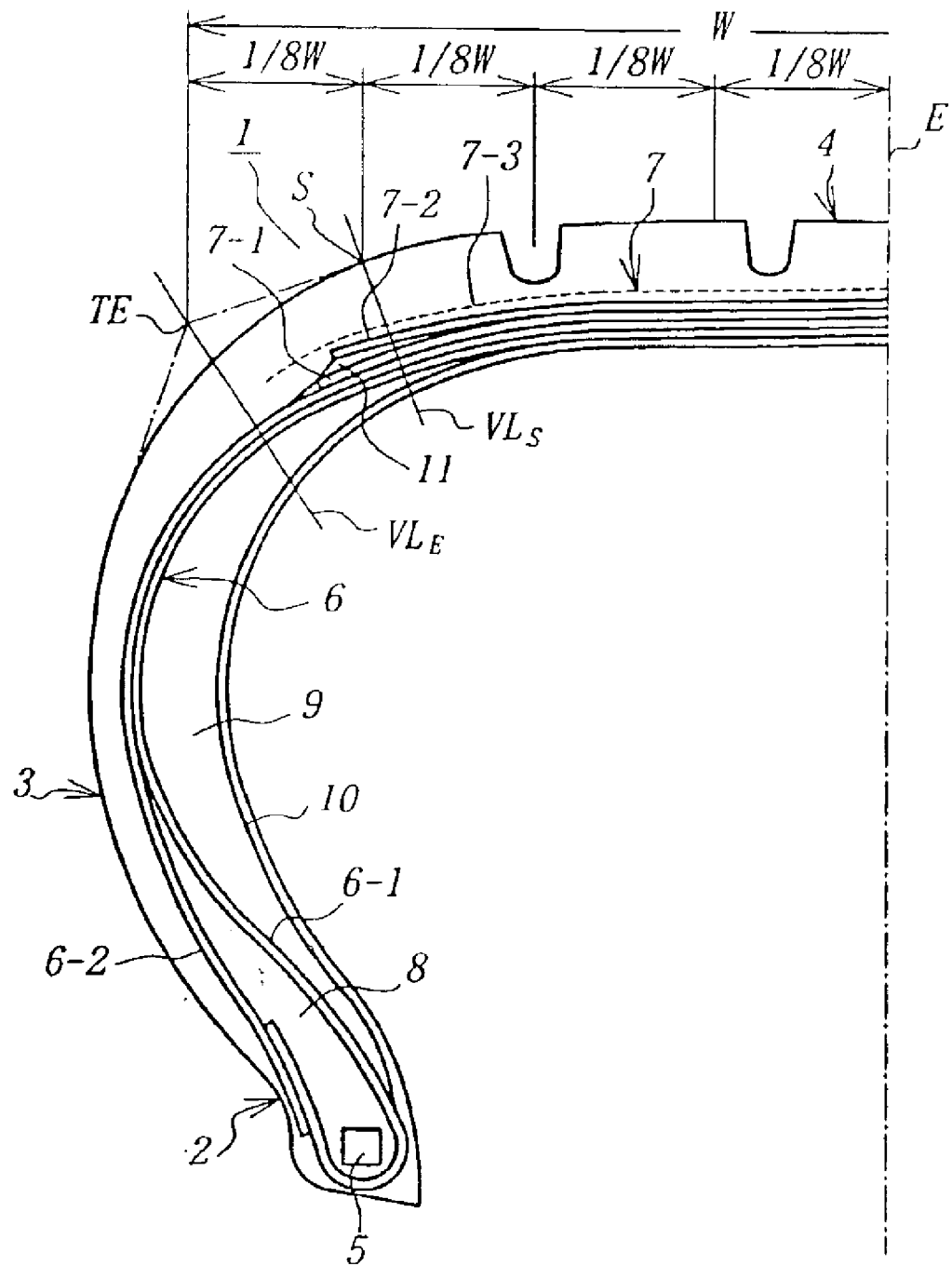
FIG. 1 is a diagrammatically left-half section view of a first embodiment of the pneumatic tire according to the invention.
Figure 2:
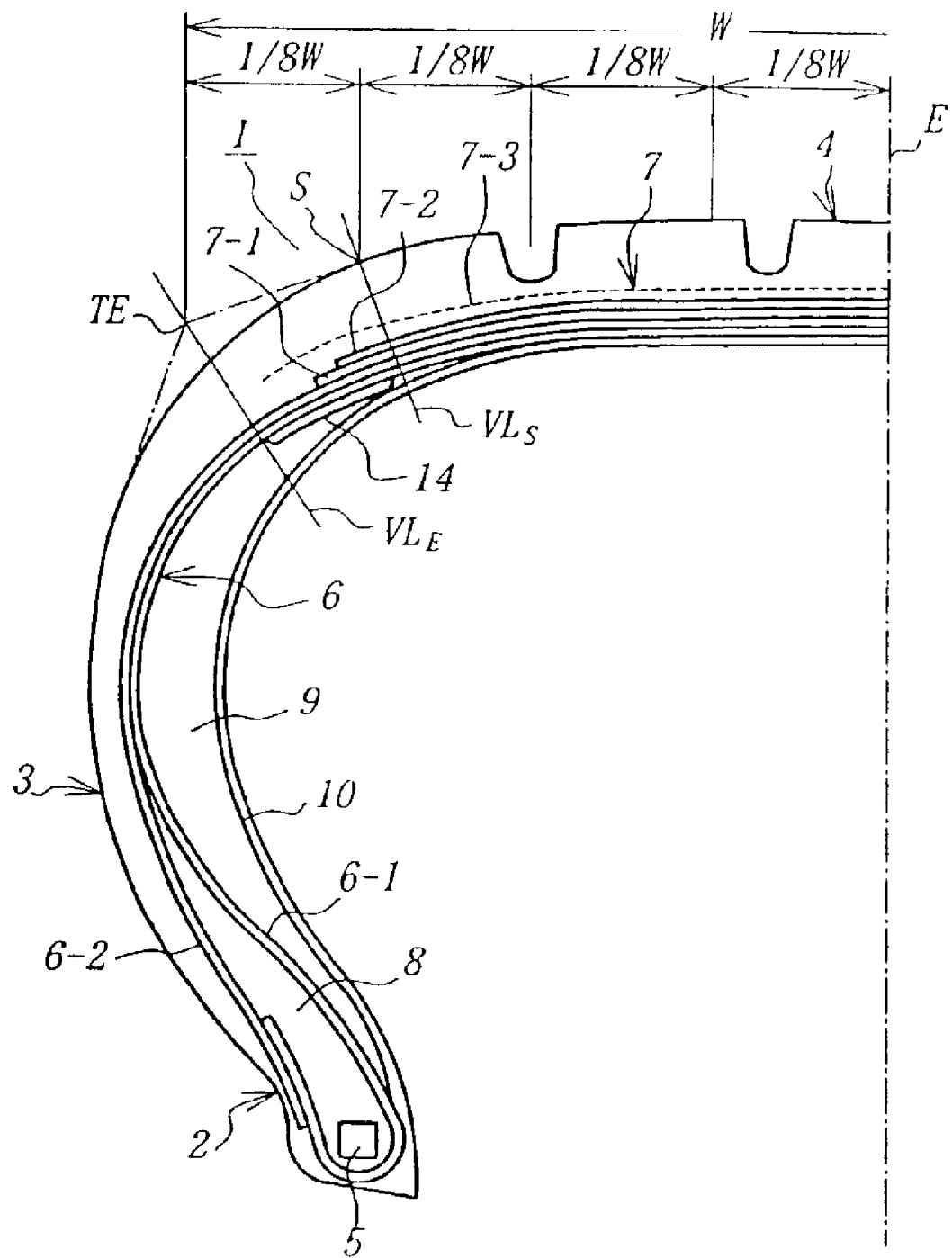
FIG. 2 is a diagrammatically left-half section view of a second embodiment of the pneumatic tire according to the invention.

A pneumatic tire 1 for passenger car shown in each of FIG. 1 and FIG. 2 comprises a pair of bead portions 2 (only one is shown), a pair of sidewall portions 3 (only one is shown), a tread portion 4 connecting to both sidewall portions 3, and a carcass 6 extending between a pair of bead cores 5 embedded in the respective bead portions 5 to reinforce the above portions 2, 3, 4 and comprised of one or more rubberized plies of radially arranged cords, two plies in the illustrated embodiment.

The carcass 6 of the illustrated embodiment comprises a turnup ply 6-1 having a turnup portion wound around the bead core 5 from an inside of the tire 1 toward an outside thereof, and a down ply 6-2 enclosing a main body and turnup portion of the turnup ply 6-1 from the outside thereof between the mutual bead cores 5 and having a terminal end near to the bead core 5. When the carcass 6 is one ply, it is the turnup ply 6-1. In the carcass 6 of the illustrated embodiment comprised of 2 plies, the down ply 6-2 is an outermost carcass ply. As a cord in each ply 6-1, 6-2 of the carcass 6, it is possible to use either of an organic fiber cord such as nylon cord, polyester cord, rayon cord or the like and steel cord.

On an outer periphery of the carcass 6 is provided a belt 7 reinforcing the tread portion 4. The belt 7 is comprised of two or more layers, two steel cord cross layers 7-1, 7-2 in the illustrated embodiment. The cord cross layers have a structure that cords of the adjacent layers are crossed with each other with respect to an equatorial plane E of the tire. In the steel cord cross layers 7-1, 7-2 of the illustrated embodiment, a width of the steel cord layer 7-1 adjacent to the outermost ply or down ply 6-2 of the carcass 6 is wider than a width of the outer steel cord layer 7-2.

As shown by dotted lines in FIGS. 1 and 2, the belt 7 of the illustrated embodiment is provided with a helically wound layer 7-3 of an organic fiber cord such as nylon-66 cord or Kevlar cord enclosing the two steel cord cross layers 7-1, 7-2 from the outside thereof, but the helically wound layer 7-3 is not always required. Therefore, the end portion of the belt 7 means end portions of the steel cord cross layers hereinafter.

Further, the tire 1 comprises a stiffener rubber 8 taperingly extending from an outer peripheral surface of the bead core 5 toward the tread portion 4. The stiffener rubber 8 is enclosed with the main body and turnup portion of the turnup ply 6-1.

And also, the tire 1 is provided at an inner face side of the turnup ply 6-1 as an innermost ply of the carcass 6 with a reinforcing rubber layer 9 having a crescent shape at a section thereof inherent to the run flat tire. The reinforcing rubber layer 9 is arranged in a region ranging from the vicinity of the bead core 5 through the sidewall portion 3 to the shoulder region of the tread portion 4 so that a central part in the radial direction of the tire is a thick part of 8~12 mm in maximum gauge and both end parts in the radial direction are tapered in order to stably support total weight of the vehicle during the running even at an internal pressure of zero and prevent separation off of the tire 1 from the rim used and prevent the breakage of the tire 1 and further hold the running stability even if rapid puncture is caused during the high-speed running at, for example, 80~120 km/h to make possible the support of high-speed running and the complete running over not less than 300 km under run flat condition without causing troubles.

Moreover, the reinforcing rubber layer 9 is made from a rubber composition or a fiber-reinforced rubber composition. Further, the reinforcing rubber layer may be divided into multi layers. And also, the shape of the reinforcing rubber layer may be a rubber sheet as it is in addition to the crescent shape at section. Since the reinforcing rubber layer is enough to reinforce at least a part of the sidewall portion, the arranging position is not particularly restricted. However, in case of the reinforcing rubber layer having the crescent shape at section, it is favorable to be arranged along the inner face side of the main body of the turnup ply in the sidewall portion, and in case of the sheet-like reinforcing rubber layer, it is favorable to be arranged inside or outside the main body of the turnup ply in the sidewall portion, or it is favorable to use both the cases together.

Referring to FIGS. 1 and 2, a region enclosed between a vertical line $VL_E$ drawn to an inner face of an innermost carcass ply (turnup ply 6-1) through a ground contact end TE and a vertical line $VL_S$ drawn to the inner face of the innermost carcass ply (turnup ply 6-1) through a ground contact position S separated by ⅛ width from the ground contact end TE toward a side of the equatorial plane E of the tire when a ground contact width W of the tread portion 4 is divided into eight equal parts at a section of the tire when a tire-rim assembly formed by assembling the tire 1 onto an approved rim (not shown) is inflated under a slight pressure corresponding to 10% of a maximum air pressure calls the shoulder region as previously mentioned.

Figure 3:
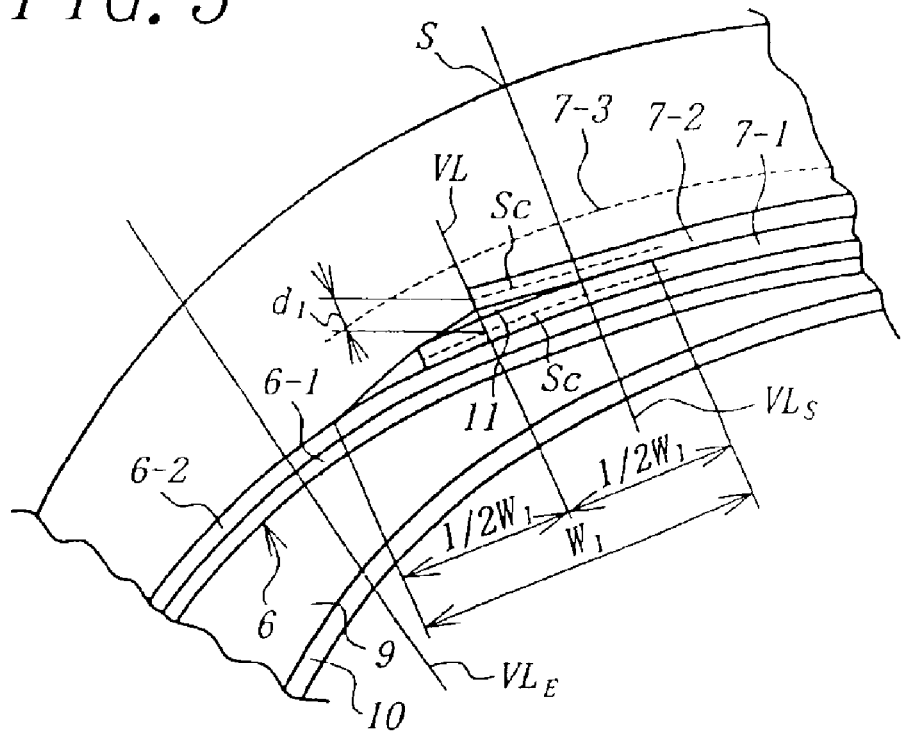
FIG. 3 is a diagrammatically enlarged section view of a main part of the tire shown in FIG. 1.
Figure 4:
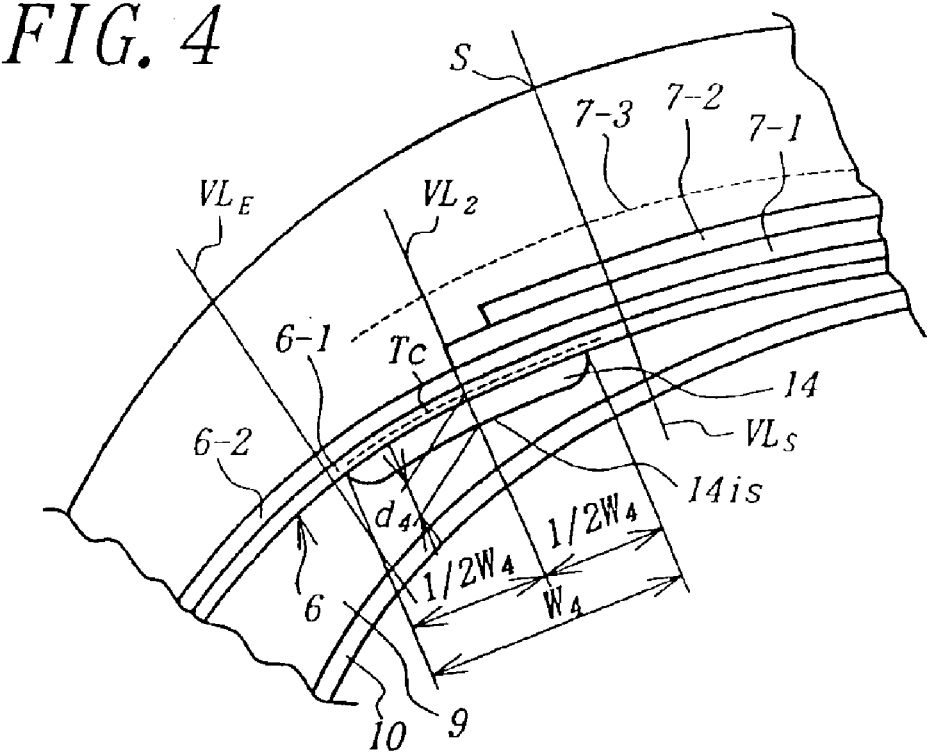
FIG. 4 is a diagrammatically enlarged section view of a main part of the tire shown in FIG. 2.

In this case, both end portions of the steel cord layer forming the steel cord cross layers of the belt 7 are existent in both the shoulder regions. In the belt 7 of the illustrated embodiment, the end portion of each of the steel cord cross layers 7-1, 7-2 is existent in each shoulder region. The tire 1 is provided with at least one cushion rubber layer arranged between the end portion of the belt 7 and the reinforcing rubber layer 9 in the shoulder region and between mutually adjacent tire constitutional members. As the cushion rubber layer arranged between the mutually adjacent tire constitutional members, there are four kinds of cushion rubber layers 11, 12, 13 and 14, which are shown in FIGS. 1~6 every the layer (FIGS. 3 and 4 are partial enlarged views of FIGS. 1 and 2, respectively).

In this case, as the end portion of the belt 7 in the shoulder region is adopted an end portion of a narrow-width steel cord layer in the steel cord cross layers 7-1, 7-2, or an end portion of the steel cord layer 7-2 located apart from the carcass 6 in the illustrated embodiment. Moreover, this end portion means a portion ranging inward from the edge of the belt layer by a distance of, for example, 10~20 mm in the widthwise direction.

Among the mutually adjacent tire constructional members between the end portion of the belt 7 and the reinforcing rubber layer 9 in the shoulder region, two constitutional members located at the outermost side in the radial direction are the steel cord cross layers 7-1, 7-2. The tire 1 having a first cushion rubber layer 11 arranged between the end portions of these mutual steel cord layers 7-1, 7-2 is shown in FIG. 1 (FIG. 3). Two constitutional members located at the innermost side in the radial direction are the innermost ply, the turnup ply 6-1 in the illustrated embodiment and the reinforcing rubber layer 9. The tire 1 having a fourth cushion rubber layer 14 arranged between these mutual members is shown in FIG. 2 (FIG. 4). Moreover, when the belt 7 is comprised of three or more steel cord cross layers in the tire 1 shown in FIG. 1, at least one of the first cushion rubber layer 11 is arranged between the mutual end portions among these layers.

Figure 5:
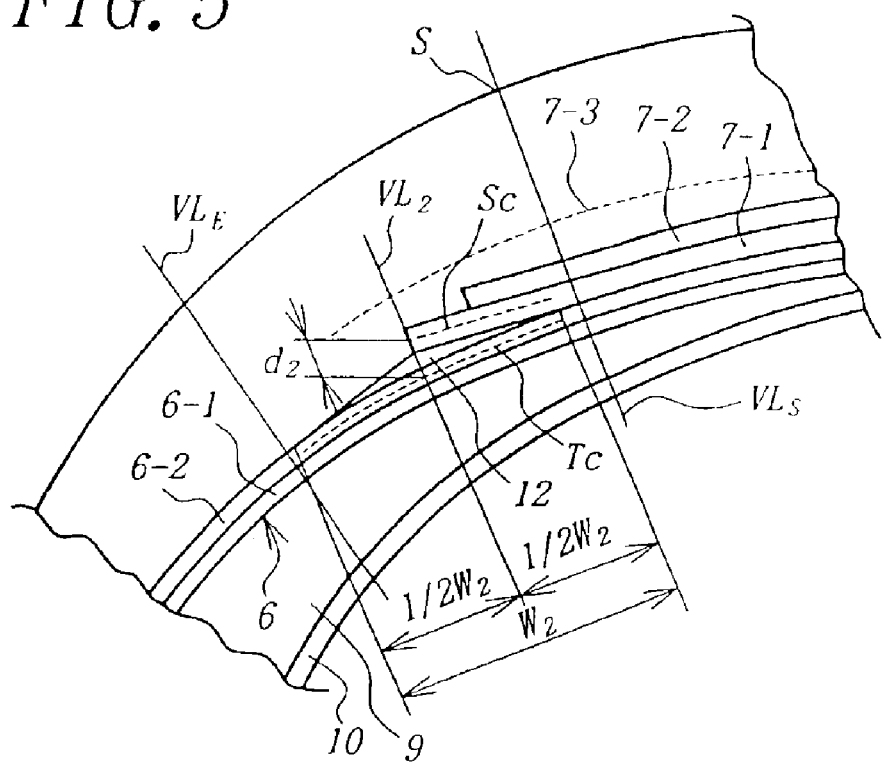
FIG. 5 is a diagrammatically enlarged section view of a main part in a third embodiment of the pneumatic tire according to the invention.
Figure 6:
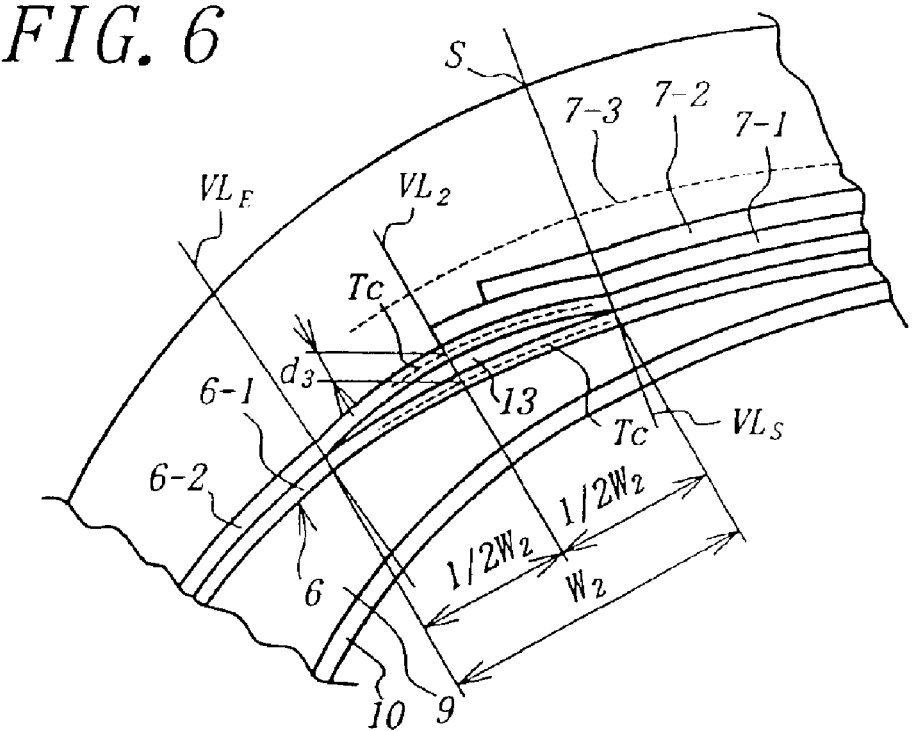
FIG. 6 is a diagrammatically enlarged section view of a main part in a fourth embodiment of the pneumatic tire according to the invention.

And also, there are the outermost ply, the down ply 6-2 in the illustrated embodiment and the steel cord layer 7-1 as the mutually adjacent tire constructional members. A main part of the tire 1 having a second cushion rubber layer 12 arranged therebetween is shown in FIG. 5. As the other mutually adjacent tire constitutional members, there are the turnup ply 6-1 and the down ply 6-2. A main part of the tire 1 having a third cushion rubber layer 13 arranged therebetween is shown in FIG. 6. In the tire 1 shown in FIG. 6, when the carcass 6 has plural turnup plies 6-1, or when the carcass 6 has plural down plies 6-2, at least one of the third cushion rubber layer 13 is arranged between the mutual turnup plies 6-1 or between the mutual down plies 6-2, respectively. Moreover, the cushion rubber layer 11, 12, 13, 14 is made of rubber having a loss tangent (hereinafter shown as tan δ) smaller than tan δ of coating rubber for cords of the ply constituting the carcass 6.

The function and effect by arranging the cushion rubber layer 11, 12, 13, 14 will be described below.

Figure 7:
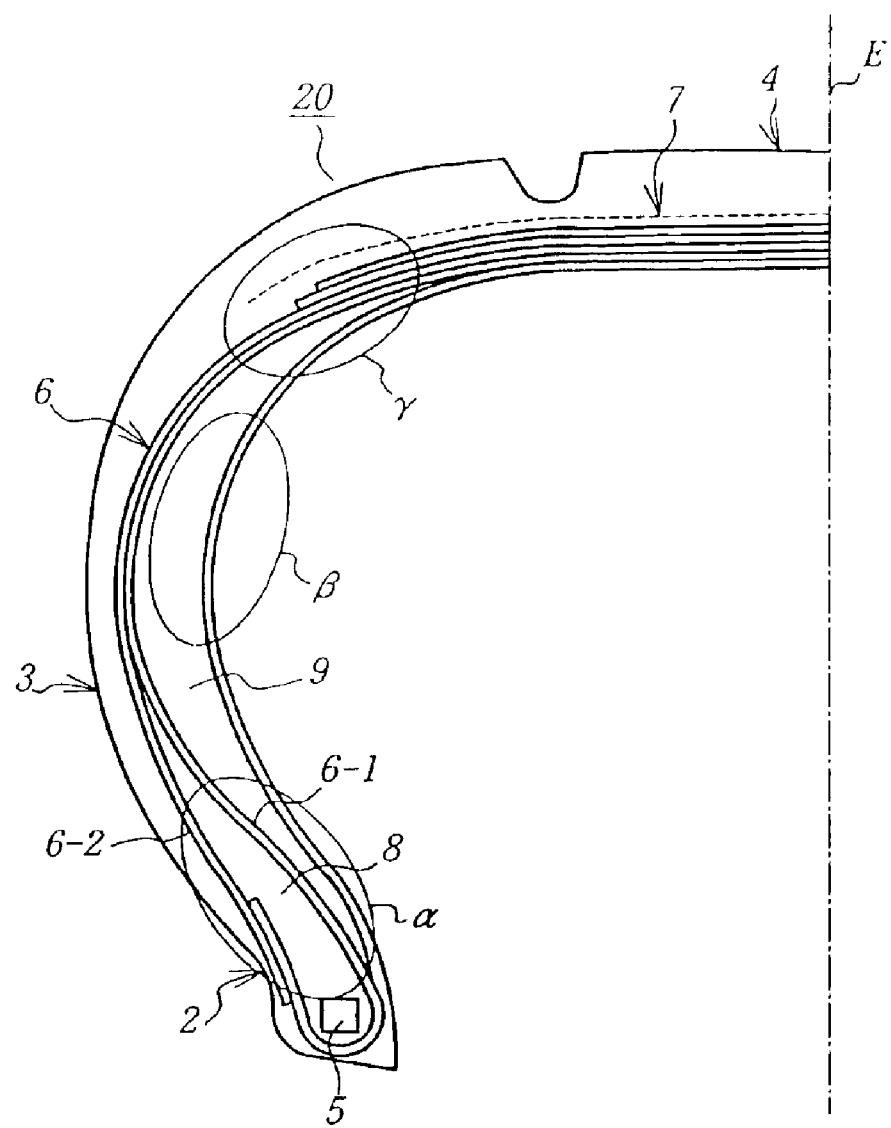
FIG. 7 is a diagrammatically left-half section view of the conventional tire showing trouble sites together.
Figure 8:
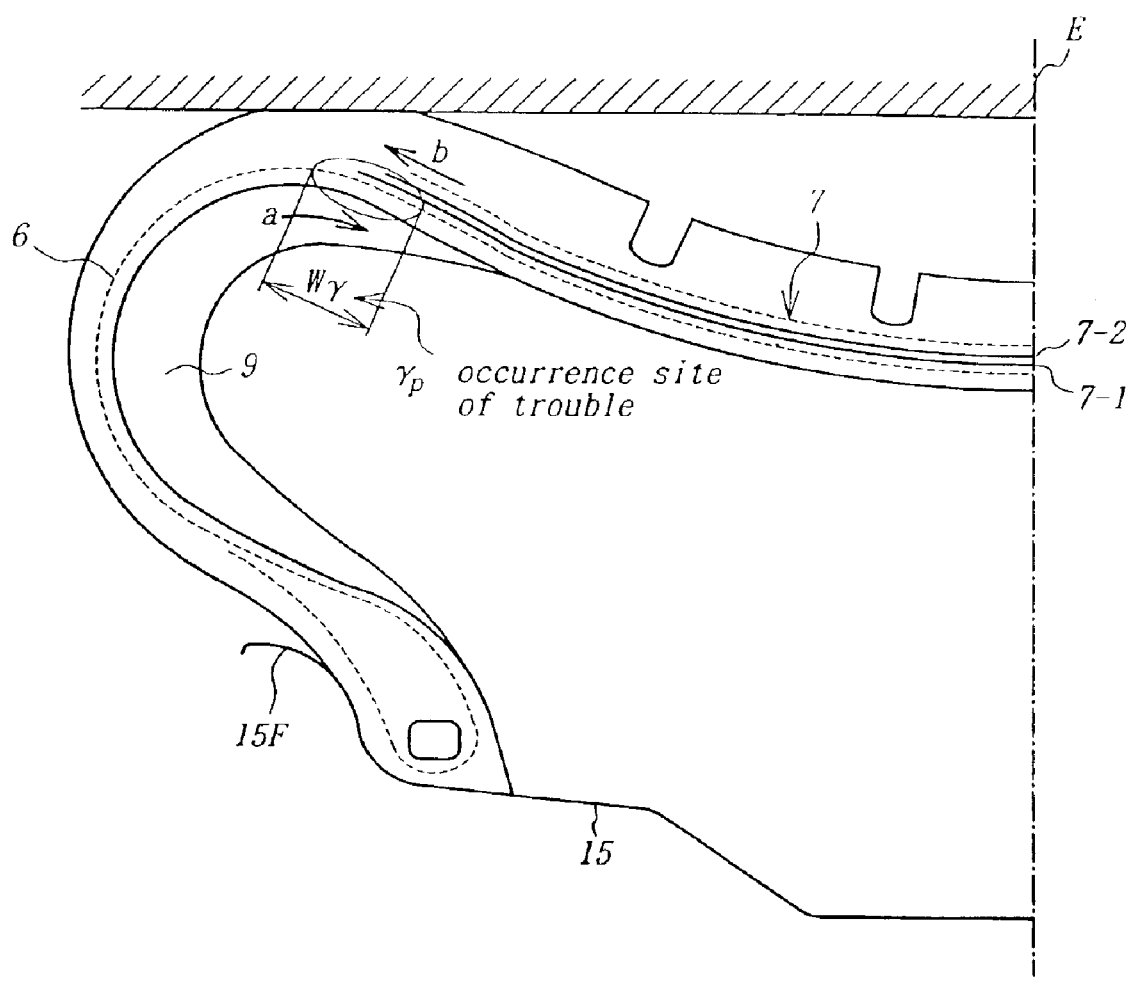
FIG. 8 is a diagrammatically right-half section view of the conventional tire just under loading during the run flat running

FIG. 8 is a diagrammatically right-half section view illustrating a behavior of bending deformation just under loading or in the vicinity thereof during run flat running of the conventional tire 20 assembled on a rim 15 with a flange 15F (FIG. 7). As shown in FIG. 8, the reinforcing rubber layer 9 in the region γ shown in FIG. 7 is subjected to compression due to the large bending deformation of the sidewall portion 3 as a whole, so that an outer portion of the reinforcing rubber layer 9 in the radial direction is pushed out toward the equatorial plane E of the tire. By such a pushed deformation is applied a force in a direction of arrow toward the side of the equatorial plane E of the tire to the ply of the carcass 6 shown by dotted lines.

On the other hand, the steel cord cross layers 7-1, 7-2 of the belt 7 having a high stiffness even under an internal pressure of zero strongly counter to buckling deformation of the tread portion 4, so that the end portion of the belt 7 having free ends intends to move toward the outside of the tire and hence force in a direction of arrow b opposite to the direction of arrow a is applied to the ply of the carcass 6. The forces in the opposed directions of arrows a and b create shearing strain $γ_P$ between the mutually adjacent constitutional members existing between the end portion of the belt 7 and the reinforcing rubber layer 9 in the region γ opposite thereto.

As the stiffener rubber 8 and the reinforcing rubber layer 9 are more strengthened for preventing troubles in the region α and region β (see FIG. 7), the force in the direction of arrow a and force in the direction of arrow b more increase, and as a result it could be elucidated that (1) the shearing strain $\gamma_P$ increases;
(2) the increasing zone of the shearing strain $\gamma_P$ in problem is within a range from an edge of the steel cord layer 7-1 located inside the belt 7 in the radial direction to about 5 mm toward the outside of the tire and to about 10 mm toward the inside of the tire; and
(3) the increase of the shearing strain $\gamma_P$ exerts upon
 (i) increase of shearing strain $\gamma_{P1}$ between mutual end portions of the belt 7,
 (ii) increase of shearing strain $\gamma_{P2}$ between the end portion of the steel cord layer 7-1 in the belt 7 and the ply of the carcass 6,
 (iii) increase of shearing strain $\gamma_{P3}$ between plies of the carcass 6 (plural plies) and
 (iv) increase of shearing strain $\gamma_{P4}$ between the innermost ply of the carcass 6 and the reinforcing rubber layer 9.

By these large shearing strains $\gamma_{P1}$, $\gamma_{P2}$, $\gamma_{P3}$, $\gamma_{P4}$ is created a big shearing deformation between mutually laminated constitutional members arranged between the end portion of the belt 7 and the reinforcing rubber layer 9 in the shoulder region. The big shearing deformation is repeated to cause heat build up in rubber of the laminated constitutional members and finally the rise of temperature due to a greater amount of heat build up brings about heat breakage of rubber in the laminated constitutional members. Especially, it has been found out that the big shearing deformation between the mutual plies 6-1, 6-2 of the carcass 6 and the heat breakage due to the great amount of heat build up accompanied therewith are serious and they compositely cause the trouble in the region γ.

For this end, at least one of the cushion rubber layer 11, 12, 13, 14 is arranged between the mutually adjacent tire constitutional members located between the end portion of the belt 7 and the reinforcing rubber layer 9 of the shoulder region in the region γ surrounded by an ellipsoidal line in FIG. 8 or in a region of a width Wγ at the trouble site due to the shearing strain $\gamma_P$ to thereby bear the shearing strain $\gamma_P$ by the cushion rubber layer 11, 12, 13, 14 and hence the shearing strain applied to the constitutional members of the tire 1 can be mitigated because only the remainder $\Delta\gamma_P$ deducting the born amount from the shearing strain is applied to the constitutional members.

As a result of mitigating the shearing strain $\gamma_P$, the amount of heat build up in rubber of each constitutional member at the region γ is reduced and particularly the heat trouble in the plies 6-1, 6-2 of the carcass 6 hardly occurs. Furthermore, tan δ of the cushion rubber layer 11, 12, 13, 14 is smaller than tan δ of coating rubber for the cords in the plies 6-1, 6-2 of the carcass 6, so that the heat build up of the cushion rubber layer is restricted to a range of small amount and there is no fear that an evil influence of increasing the amount of the heat build up is caused by the arrangement of the cushion rubber layer 11, 12, 13, 14.

Since it is possible to avoid the trouble in the region Y by arranging the cushion rubber layer 11, 12, 13, 14, the actions of the stiffener rubber 8 and the reinforcing rubber layer 9 can be more strengthened and hence it is possible to considerably improve the run flat durability of the tire 1 by the action of the cushion rubber layer 11, 12, 13, 14 and the stiffener rubber 8 and the reinforcing rubber layer 9 together.

Although the run flat durability is improved by arranging any one of the cushion rubber layers 11, 12, 13 and 14, it is favorable to arrange two or more layers in combination in order to largely improve the run flat durability as compared with the conventional tire 20 (see FIG. 7). Even when two or more of the cushion rubber layers 11, 12, 13 and 14 are arranged, the ratio of weight increase is very small in the run flat tire having a tire weight heavier than that of the general-purpose tire and the rise of the coat is slight. Moreover, if the line of the carcass 6 is slightly shifted toward the inside of the tire, the tread rubber in the tread portion can be rendered into the same gauge distribution as in the conventional tire 20, so that the degradation of wear life of the tread rubber is not brought and the rim assembling is not obstructed.

In the light that the trouble in the region γ is due to the heat build up of the tire constitutional members, the following experiment is carried out by using radial tires 1 for passenger car having a tire size of 225/60R16 for specifying acceptable range of tan δ in the cushion rubber layer 11, 12, 13, 14 arranged in the shoulder region causing the big shearing strain $\gamma_P$. As the experimental conditions are an internal pressure of zero (state of taking out a valve core), a load of 570 kgf corresponding to 76% of a maximum load capacity of 750 kg (mass) of the above tire described in JATMA YEAR BOOK (1998) and a speed of 89 km/h.

All of widths $W_1$, $W_2$, $W_3$, $W_4$ of the cushion rubber layers 11, 12, 13, 14 (see FIGS. 3~6) are 30 mm, and all of distances $d_1$, $d_2$, $d_3$, $d_4$ through the cushion rubber layers 11, 12, 13, 14 (see FIGS. 3~6) are 2.0 mm. The value of tan δ are represented by 4 levels under test conditions that a temperature is 25° C., an initial load is 160 gf, a dynamic strain is 1.0% and a frequency is 52 Hz. The control is the conventional run flat tire 20 shown in FIG. 7.

Figure 9:
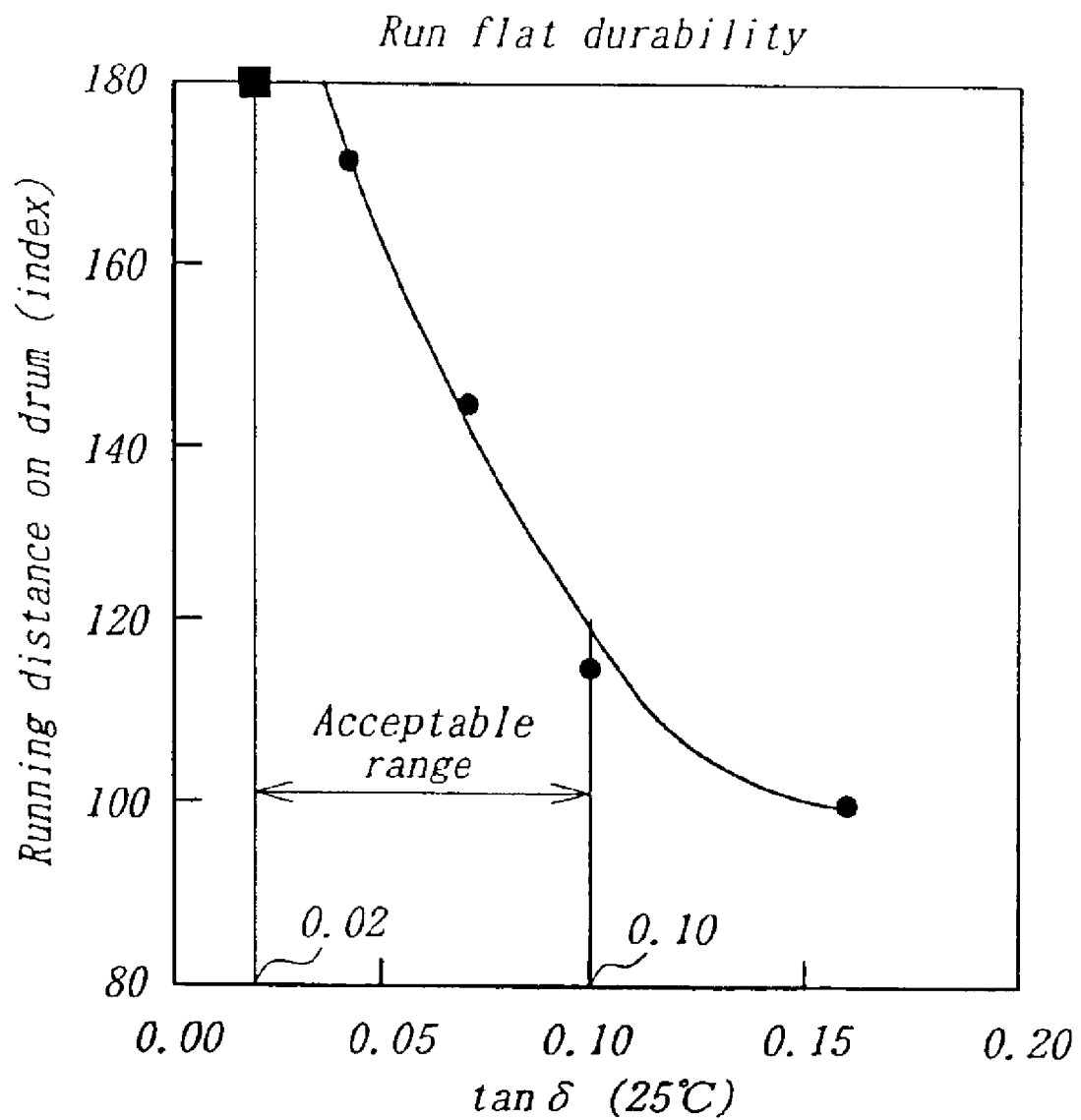
FIG. 9 is a graph showing a relation between run flat durability and tan δ of a cushion rubber layer.

The running distance till the occurrence of troubles in the tires 1 and 20 is evaluated as the run flat durability. The experimental results are shown in FIG. 9 as a relation between running distance on drum (index) represented by an index on the basis that the conventional tire 20 is 100 and tan δ (25° C.) of rubber in the cushion rubber layer 11, 12, 13, 14. As seen from FIG. 9, the running distance on drum predominantly exceeds that of the conventional tire 20 at tan δ of not more than 0.10. And also, when tan δ is less than 0.02, the trouble is no longer caused in the region γ, so that the lower limit of tan δ is 0.02 assuming that the other performances and durability are equally held as compared with those of the conventional tire 20. Moreover, mark ● shown in FIG. 9 shows trouble in the region γ and mark ■ shows trouble in a region other than the region γ, which are the same in FIGS. 10~17 as mentioned later.

In order to determine ranges of acceptable widths $W_1$, $W_2$, $W_3$, $W_4$ of the cushion rubber layers 11, 12, 13, 14 effective for the mitigation of shearing strains $\gamma_{P1}$, $\gamma_{P2}$, $\gamma_{P3}$, $\gamma_{P4}$, particularly acceptable width $W_3$ of the cushion rubber layer 13 effective for the mitigation of shearing strain $\gamma_{P3}$ between the plies 6-1 and 6-2, experiments are carried out under the same test conditions as mentioned above. The tan δ (25° C.) of each cushion rubber layer is 0.07, and all of the distances $d_1$, $d_2$, $d_3$, $d_4$ are 2.0 mm. The control is the conventional tire 20 of FIG. 7.

The experimental results evaluating the running distance till the occurrence of trouble in the tires 1 and 20 as a run flat durability are shown in FIGS. 10–13 as a relation between running distance on drum (index) represented by an index on the basis that the conventional tire 20 is 100 and each of widths $W_1$, $W_2$, $W_3$, $W_4$ of the cushion rubber layers 11, 12, 13, 14, respectively.

Figure 10:
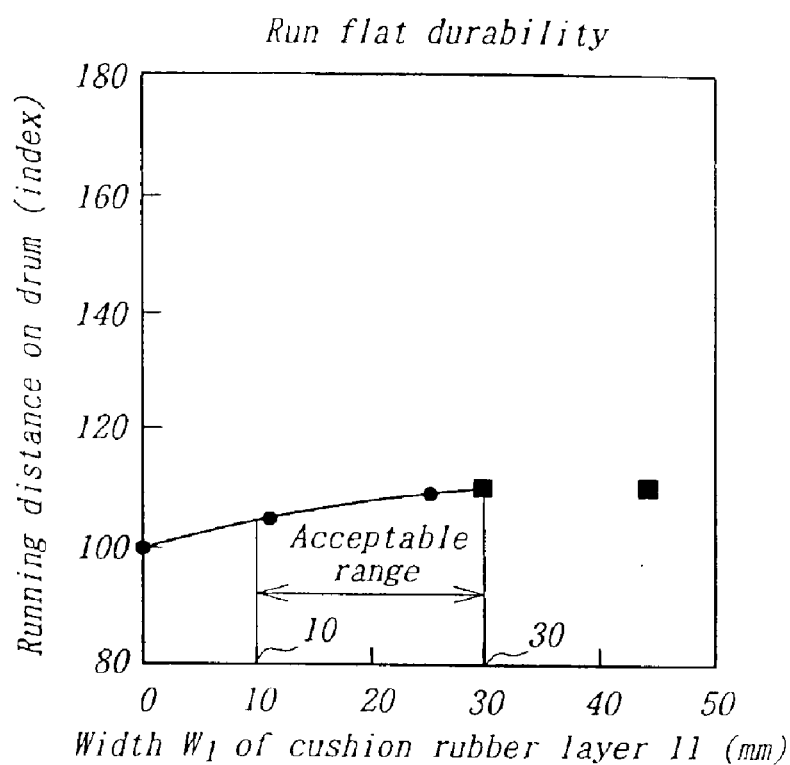
FIG. 10 is a graph showing a relation between run flat durability and a width of a cushion rubber layer.
Figure 11:
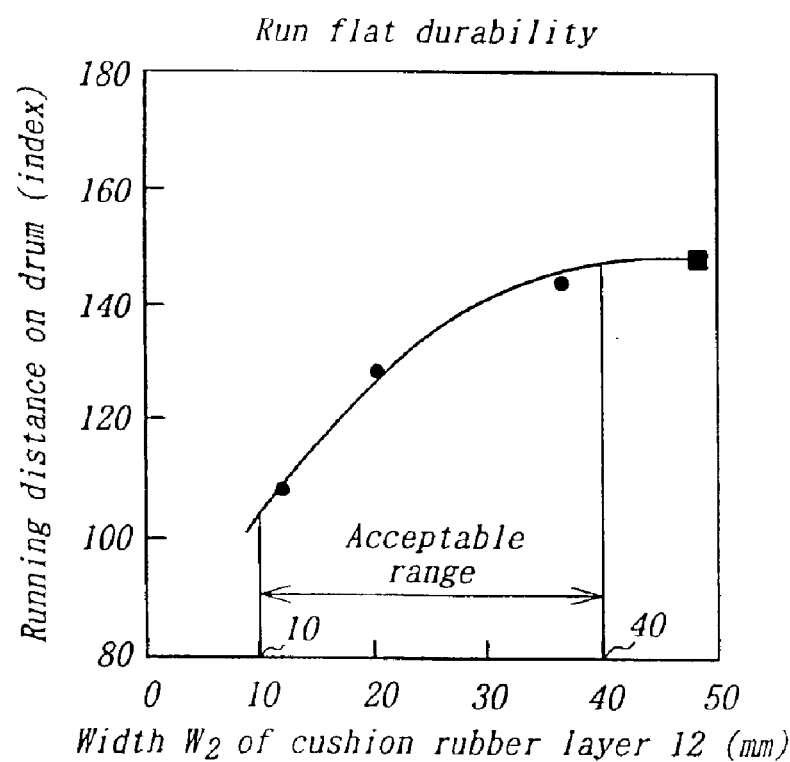
FIG. 11 is a graph showing a relation between run flat durability and a width of another cushion rubber layer.
Figure 12:
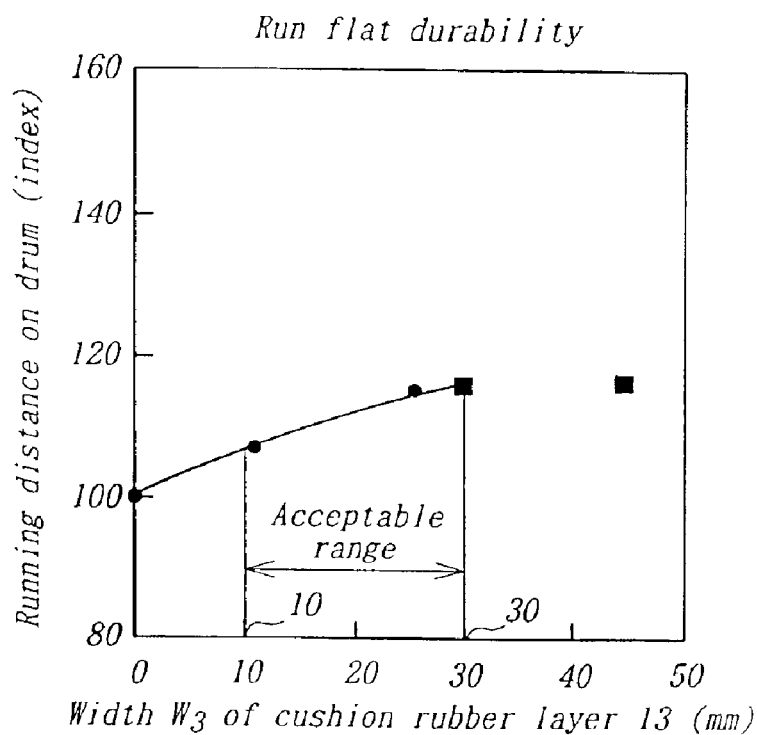
FIG. 12 is a graph showing a relation between run flat durability and a width of the other cushion rubber layer.
Figure 13:
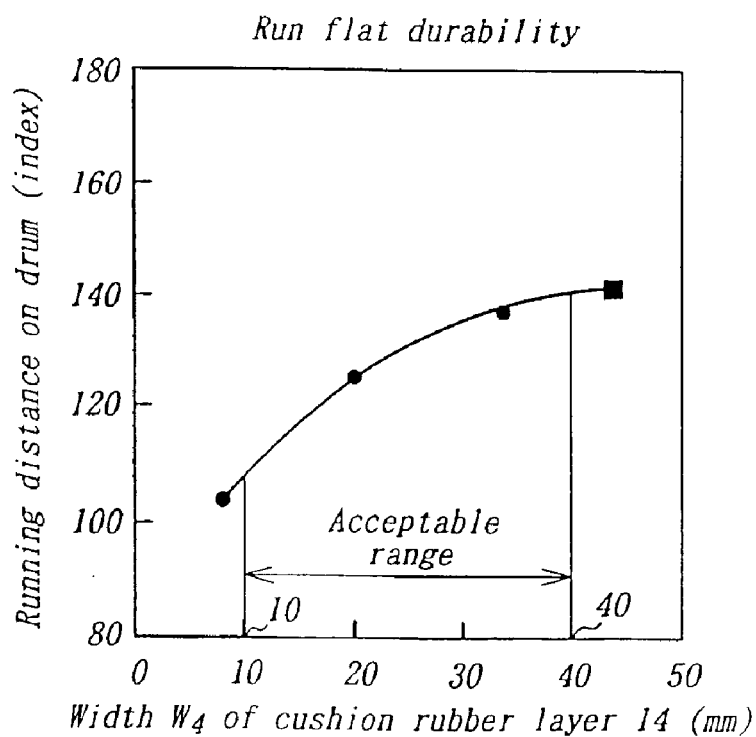
FIG. 13 is a graph showing a relation between run flat durability and a width of a still further cushion rubber layer.

It can be seen from FIG. 10 that the width $W_1$ of the cushion rubber layer 11 is acceptable within a range of 10~30 mm, from FIG. 11 that the width $W_2$ of the cushion rubber layer 12 is acceptable within a range of 10~40 mm, from FIG. 12 that the width $W_3$ of the cushion rubber layer 13 is acceptable within a range of 10~30 mm, and from FIG. 13 that the width $W_4$ of the cushion rubber layer 14 is acceptable within a range of 10~40 mm, respectively.

When the width $W_1$ of the cushion rubber layer 11 exceeds 30 mm, the width $W_2$ of the cushion rubber layer 12 exceeds 40 mm, the width $W_3$ of the cushion rubber layer 13 exceeds 30 mm, and the width $W_4$ of the cushion rubber layer 14 exceeds 40 mm, the running distance on drum is saturated and only the tire weight is undesirably increased to transfer the trouble to other region.

In order to determine ranges of acceptable distances $d_1$, $d_2$, $d_3$, $d_4$ of the cushion rubber layers 11, 12, 13, 14 effective for the mitigation of shearing strains $\gamma_{P1}$, $\gamma_{P2}$, $\gamma_{P3}$, $\gamma_{P4}$, particularly acceptable distance $d_3$ of the cushion rubber layer effective for the mitigation of shearing strain $\gamma_{P3}$ between the plies 6-1 and 6-2, experiments are carried out every the cushion rubber layer under the same test conditions as mentioned above. The tan δ (25° C.) in each cushion rubber layer is 0.07, and all of widths $W_1$, $W_2$, $W_3$, $W_4$ are 30 mm. The control is the conventional tire 20 of FIG. 7.

The experimental results evaluating the running distance till the occurrence of trouble in the tires 1 and 20 as a run flat durability are shown in FIGS. 14~17 as a relation between running distance on drum (index) represented by an index on the basis that the conventional tire 20 is 100 and each of distances $d_1$, $d_2$, $d_3$, $d_4$ through the cushion rubber layers 11, 12, 13, 14, respectively.

Figure 14:
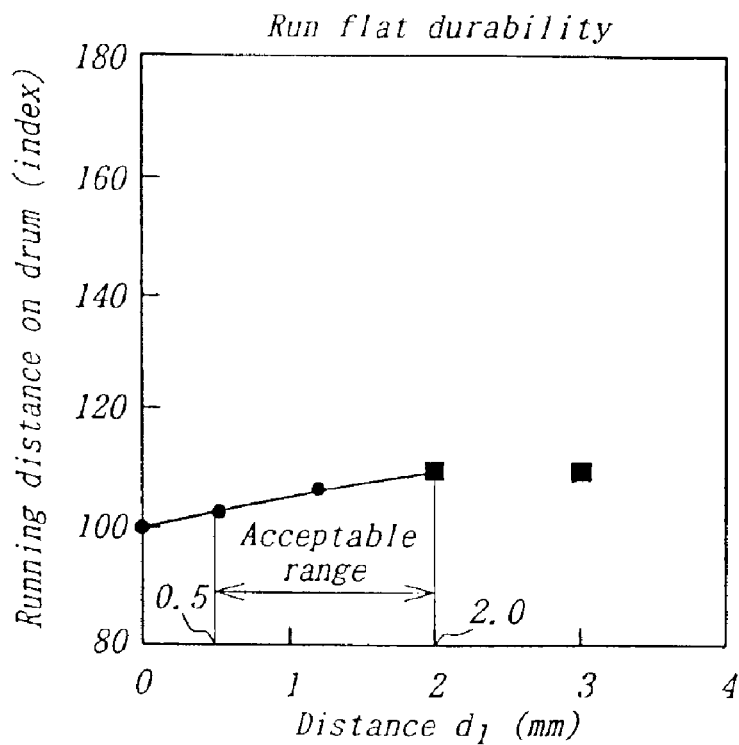
FIG. 14 is graph showing a relation between run flat durability and a distance between cords.
Figure 15:
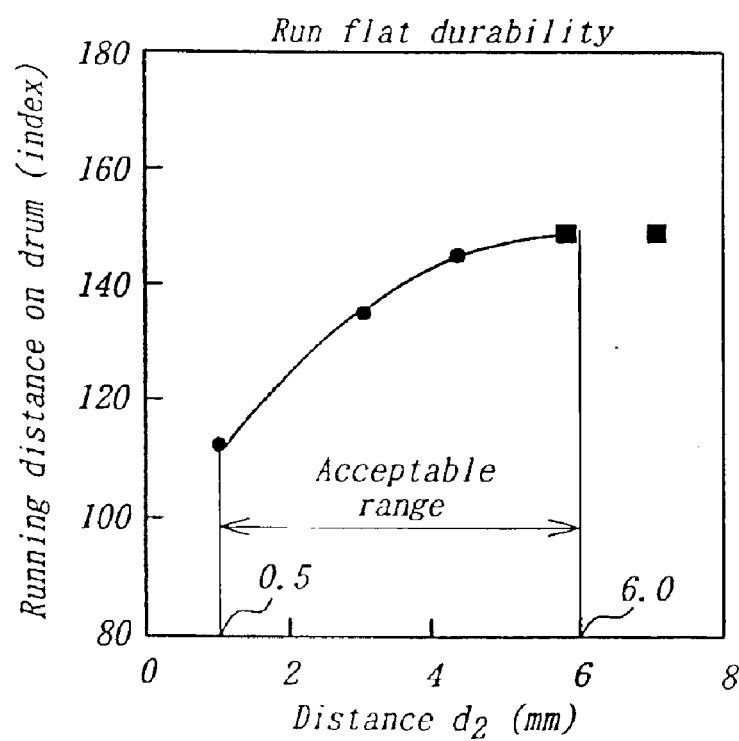
FIG. 15 is graph showing a relation between run flat durability and another distance between cords.
Figure 16:
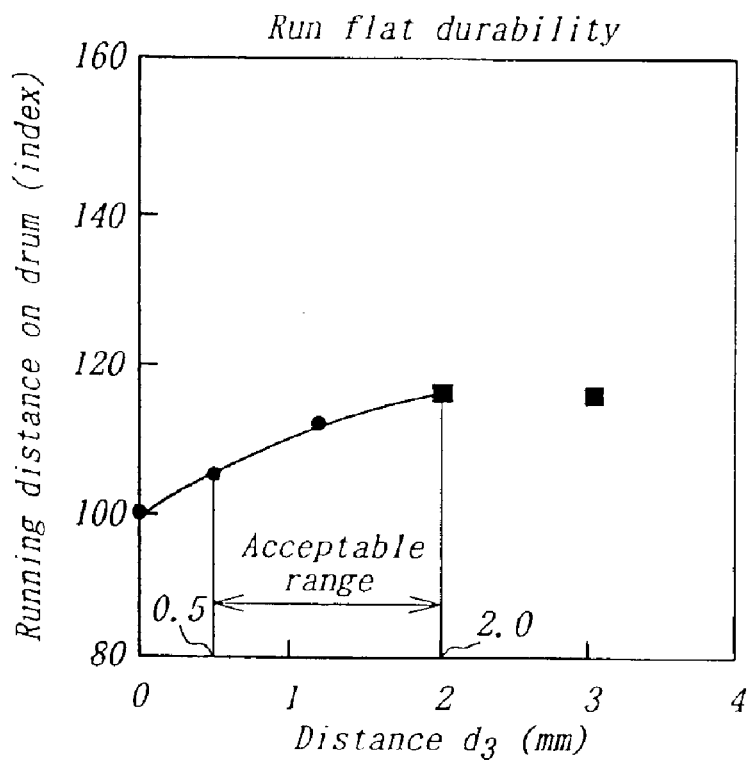
FIG. 16 is a graph showing a relation between run flat durability and the other distance between cords.
Figure 17:
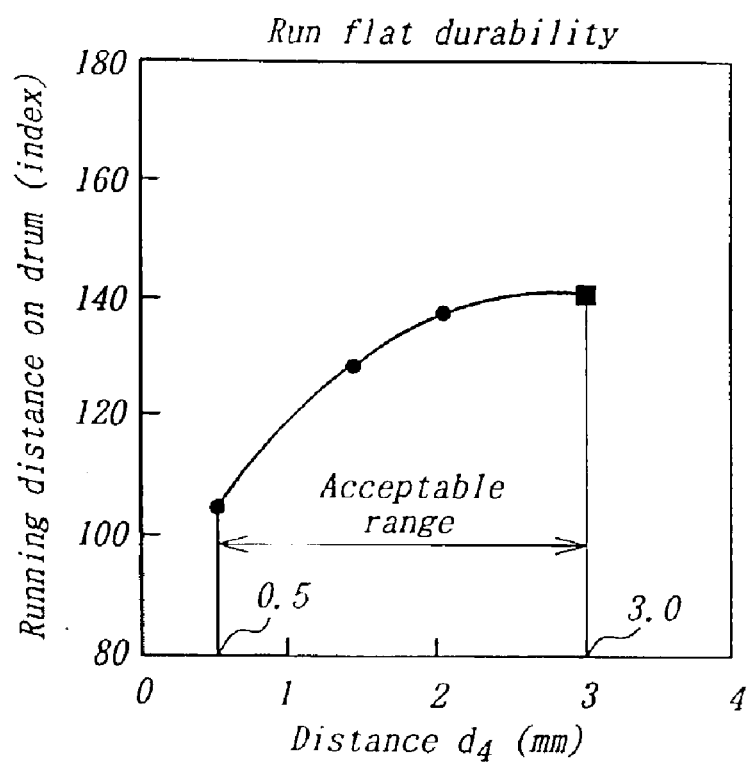
FIG. 17 is a graph showing a relation between run flat durability and a distance from a carcass ply cord to an inner face of a cushion rubber layer.

It can be seen from FIG. 14 that the distance $d_1$ is acceptable within a range of 0.5~2.0 mm, from FIG. 15 that the distance $d_2$ is acceptable within a range of 0.5~6.0 mm, from FIG. 16 that the distance $d_3$ is acceptable within a range of 0.5~2.0 mm, and from FIG. 17 that the distance $d_4$ is acceptable within a range of 0.5~3.0 mm, respectively.

When the distance $d_1$ exceeds 2.0 mm, the distance $d_2$ exceeds 6.0 mm, the distance $d_3$ exceeds 2.0 mm, and the distance $d_4$ exceeds 3.0 mm, the running distance on drum is saturated and only the tire weight is undesirably increased to transfer the trouble to other region.

Referring to FIG. 3, the first cushion rubber layer 11 having the width $W_1$ is arranged on both sides with respect to a vertical line $VL_1$ drawn to an outer surface of the outermost carcass ply (down ply 6-2) passing through an edge of the narrow-width steel cord layer 7-2 among the steel cord cross layers 7-1, 7-2 constituting the belt 7, and referring to FIGS. 4~6, the second to fourth cushion rubber layers 12, 13, 14 having the widths $W_2$, $W_3$, $W_4$ are arranged on both sides with respect to a vertical line $VL_2$ drawn to an inner surface of the outermost carcass ply (down ply 6-2) passing through an edge of the wide-width steel cord layer 7-2 in the belt 7.

It is preferable that the first cushion rubber layer 11 is dividedly arranged at an equal width of (½)×$W_1$ on both sides with respect to the vertical line $VL_1$, and the second cushion rubber layer 12 is dividedly arranged at an equal width of (½)×$W_2$ on both sides with respect to the vertical line $VL_2$, and the third cushion rubber layer 13 is dividedly arranged at an equal width of (½)×$W_3$ on both sides with respect to the vertical line $VL_2$, and the fourth cushion rubber layer 14 is dividedly arranged at an equal width of (½)×$W_4$ on both sides with respect to the vertical line $VL_2$.

In FIG. 3, the distance $d_1$ is a distance between mutual steel cords Sc at the end portions of the steel cord cross layers 7-1, 7-2 through the first cushion rubber layer 11 as measured on the vertical line $VL_1$. In FIG. 4, the distance $d_4$ is a distance from a cord Tc of the innermost carcass ply (turnup ply 6-1) to an inner surface 14 is of the fourth cushion rubber layer 14 as measured on the vertical line $VL_2$. In FIG. 5, the distance $d_2$ is a distance between the steel cord Sc at the end portion of the steel cord cross layer 7-2 and the cord Tc of the outermost carcass ply (down ply 6-2) through the second cushion rubber layer 12 as measured on the vertical line $VL_2$. In FIG. 6, the distance $d_3$ is a distance between the cords Tc of the mutually adjacent plies of the carcass 6 (turnup ply 6-1, down ply 6-2) through the third cushion rubber layer 13 as measured on the vertical line $VL_2$.

In addition, it is desirable that 50% modulus of the cushion rubber layer 11, 12, 13, 14 is lower than 505 modulus of the reinforcing rubber layer 9. Moreover, an outer coating rubber for the sidewall portion 3 can not be applied to the cushion rubber layer 11, 12, 13, 14 because this type of the outer coating rubber is essential to have a sufficiently excellent resistance to ozone and is obliged to make tan δ large for satisfying the essential condition.

Furthermore, the cushion rubber layers 11, 12, 13, 14 contribute to the effect of improving the run flat durability when a percentage ratio $(M_{50}C/M_{50}R) \times 100\%$ of 50% modulus of the cushion rubber layer 11, 12, 13, 14 ($M_{50}C$) to 50% modulus of the reinforcing rubber layer 9 ($M_{50}R$) is set to an adequate value.

Figure 18:
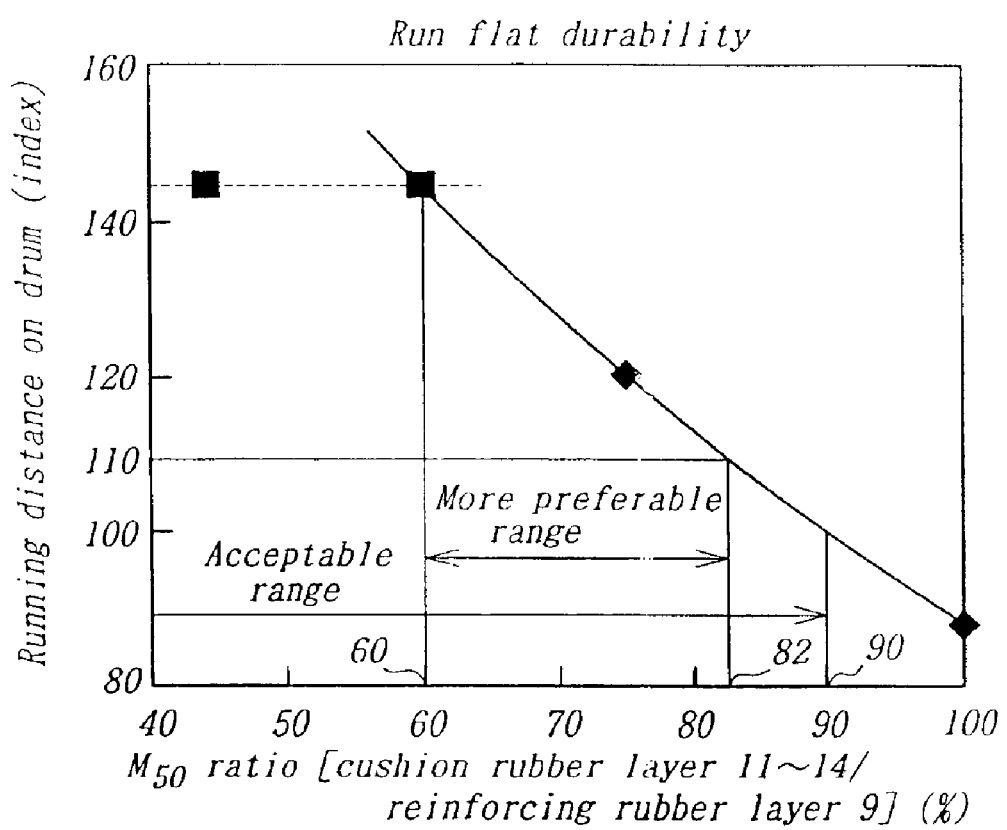
FIG. 18 is a graph showing a relation between run flat durability and a 50% modulus ratio of a cushion rubber layer to a reinforcing rubber layer.

The experiments on 50% modulus ratio ($M_{50}C/M_{50}R$) are carried out under the same test conditions as mentioned above except that the cushion rubber layers have tan δ=0.07, widths $W_1=W_2=W_3=W_4=30$ mm and distances $d_1=d_2=d_3=d_4=2.0$ mm. The experimental results evaluating the running distance till the occurrence of trouble in the tires 1 and 20 as a run flat durability are shown in FIG. 18 as a relation between running distance on drum (index) represented by an index on the basis that the conventional tire 20 is 100 and 50% modulus ratio. As seen from FIG. 18, the value of 50% modulus ratio is adaptable to be not more than 90%, while when the value of 50% modulus ratio is less than 30%, the difference of stiffness between the cushion rubber layer 11~14 and the reinforcing rubber layer 9 becomes too large and the trouble is transferred to the cushion rubber layer 11~14, so that the 50% modulus ratio is finally adaptable to be within a range of 30~90%, desirably 60~82%.

Figure 19:
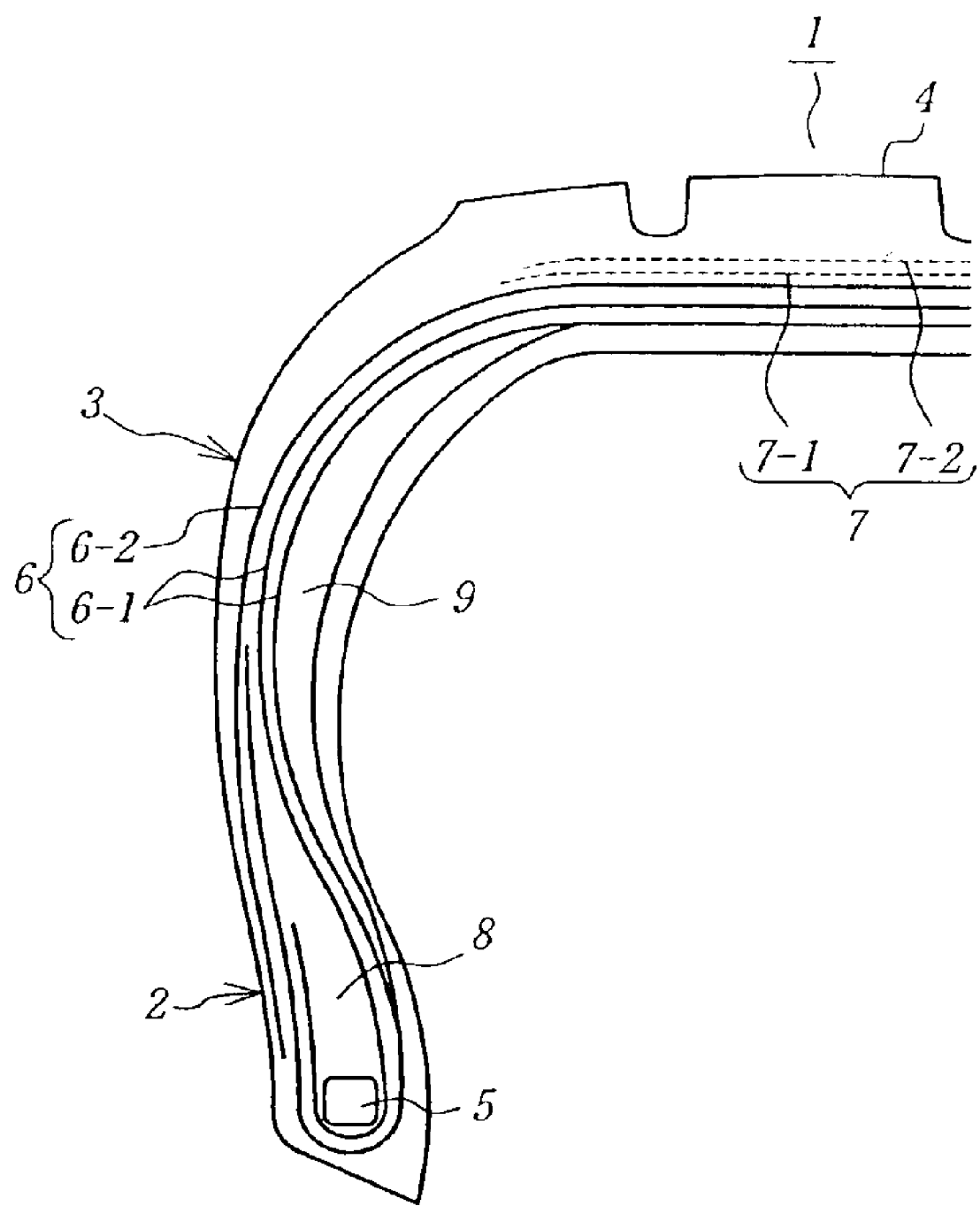
FIG. 19 is a diagrammatically left-half section view of a fifth embodiment of the pneumatic tire according to the invention.

In FIG. 19 is shown a fifth embodiment of the pneumatic tire for passenger car according to the invention, which has substantially the same structure as the tire of FIG. 5 except that the carcass 6 is comprised of two turnup plies 6-1 and down ply 6-2 and the cap ply 7-3 is not used. That is, the cushion rubber layer is not shown, but the second cushion rubber layer 12 is arranged between the end portion of the steel cord layer 7-1 in the belt 7 and the down ply 6-2 as shown in FIG. 5.

In the above pneumatic tire according to the invention, particularly pneumatic tire for passenger car, ones having a further improved ride comfort against vibrations while holding the excellent run flat durability are shown in FIGS. 20 to 27. For simplification, however, the illustration of the cushion rubber layer is omitted, but the arrangement of the second cushion rubber layer 12 shown in FIG. 5 is usually used. Moreover, the arrangements of the cushion rubber layers shown in FIGS. 3, 4 and 6 may be used.

These tires have the same structure as in FIG. 19 except that the construction of the carcass 6 differs as mentioned later. That is, the carcass 6 is comprised of two or more plies and each of these plies contains radially arranged and rubberized organic fiber cords therein. At least one ply constituting the carcass 6 contains cords of an organic fiber selected from rayon fiber, aromatic polyamide fiber, aliphatic polyamide fiber having a melting point of not lower than 250° C. as measured through DSC and polyester fiber. By using such fibers is obtained a strong adhesion to rubber member even at a higher temperature and the peeling at an interface between cord and rubber can be prevented. Especially, the aliphatic polyamide fiber gives a durability to heat, light, oxygen or the like, so that it can be used by compounding with a stabilizer consisting of, for example, a copper salt and an antioxidant. As the aliphatic polyamide fiber, nylon-6,6 and nylon-4,6 are favorable from a viewpoint of an adhesion property at a high temperature. And also, when the melting point as measured through DSC of the cord is lower than 250° C., the holding of the tire shape at the high temperature becomes difficult and it is apt to cause the fusion and breakage of the cord due to local heat generation and hence it tends to degrade the durability during the run flat running.

In the carcass comprised of two or more plies, the ride comfort against vibrations can be more improved by separating off at least one ply beneath the belt.

In general, the reinforcing rubber layer is arranged in the sidewall portion as a structure of the tire capable of running at run flat state for controlling the bending of the tire at a state that the internal pressure is zero or substantially near to zero. As a result, such a tire tends to damage the ride comfort against vibrations in the usual running or at the inflation under the normal internal pressure as compared with the usual tire. For this purpose, when at least one ply is separated off beneath the belt to from a split ply as mentioned above, the flexibility is given to a crown portion of the carcass to absorb vibrations transmitted from a road surface with the crown portion, whereby the ride comfort against vibrations can be improved.

Figure 20:
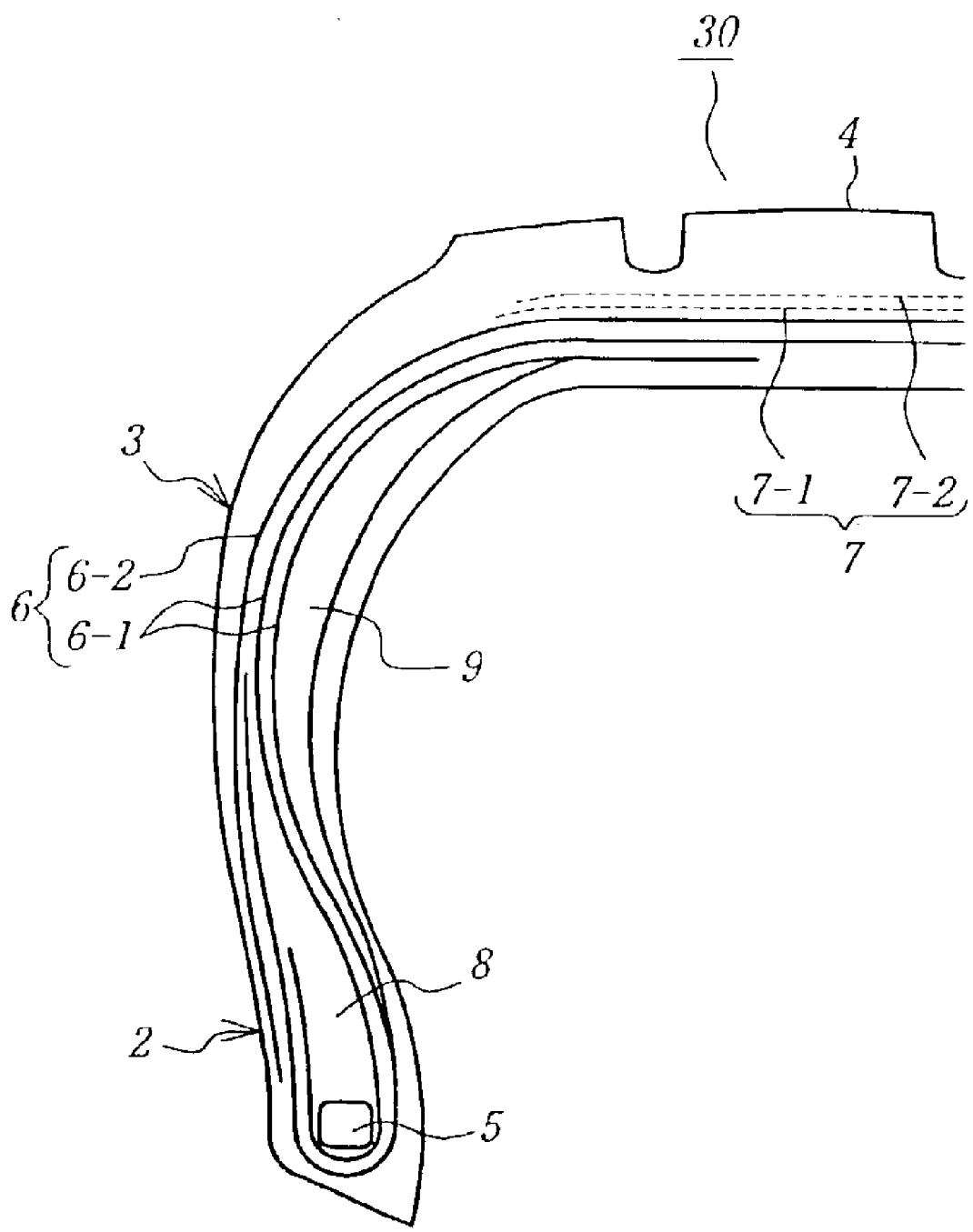
FIG. 20 is a diagrammatically left-half section view of a sixth embodiment of the pneumatic tire according to the invention.

In a tire 30 shown in FIG. 20, the carcass 6 is comprised of two turnup plies 6-1 each wound around the bead core 5 from an inside of the tire 30 toward an outside thereof to form a turnup portion and one down ply 6-2 extending between the mutual bead cores 5 to enclose the main body and the turnup portion of the turnup ply 6-1 from the outside thereof and having a terminal in the vicinity of the bead core 5, wherein an innermost turnup ply 6-1 is a split ply formed by separating off the turnup ply in a zone of the crown portion beneath the belt 7 by 40% of a width of the steel cord layer 7-1 constituting the belt 7 inclusive of a central line thereof.

Figure 21:
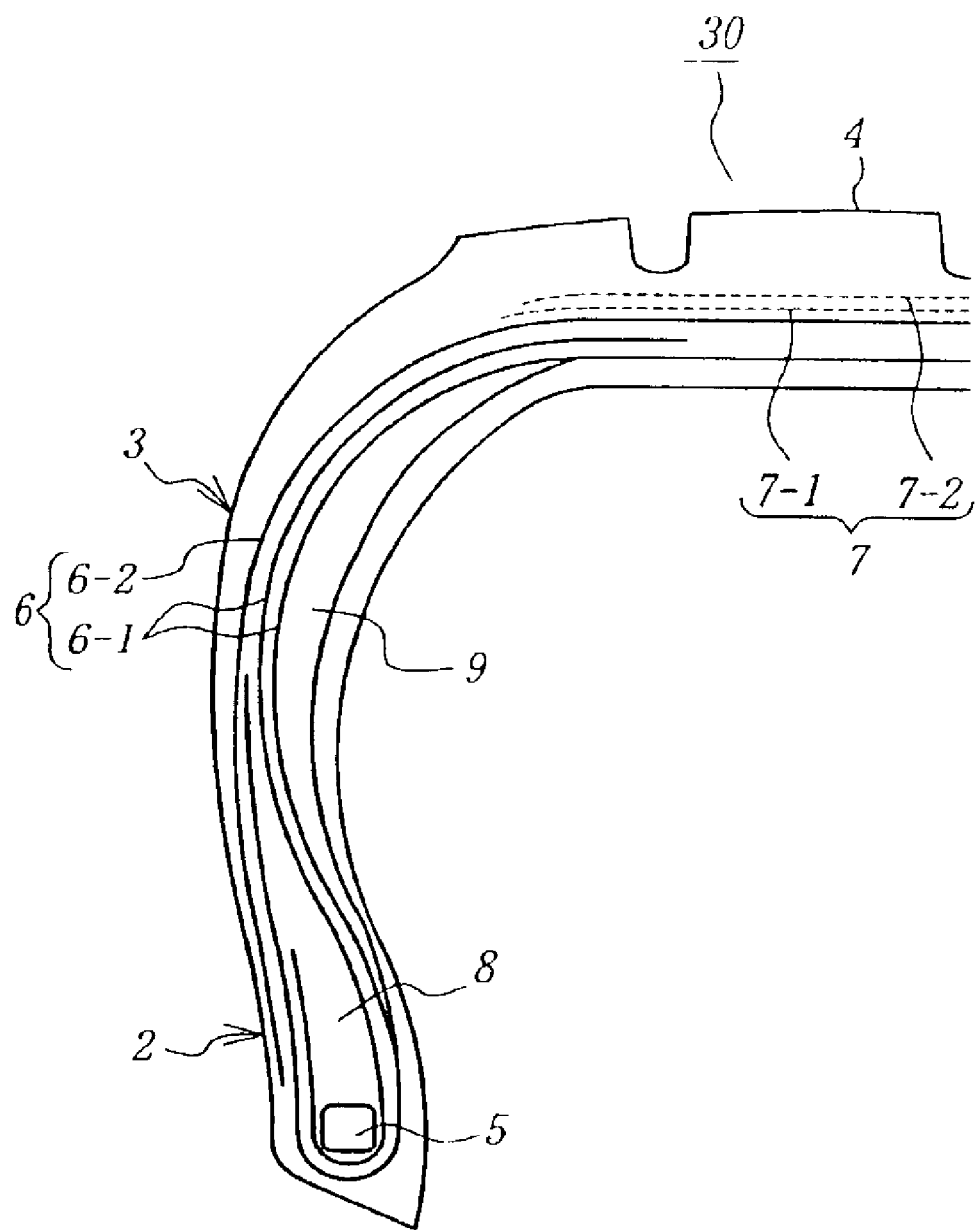
FIG. 21 is a diagrammatically left-half section view of a seventh embodiment of the pneumatic tire according to the invention.

In a tire 30 shown in FIG. 21, the carcass 6 is comprised of two turnup plies 6-1 and one down ply 6-1, wherein an outermost turnup ply 6-1 is a split ply formed by separating off the turnup ply in a zone of the crown portion beneath the belt 7 by 40% of a width of the steel cord layer 7-1 constituting the belt 7 inclusive of a central line thereof.

Figure 22:
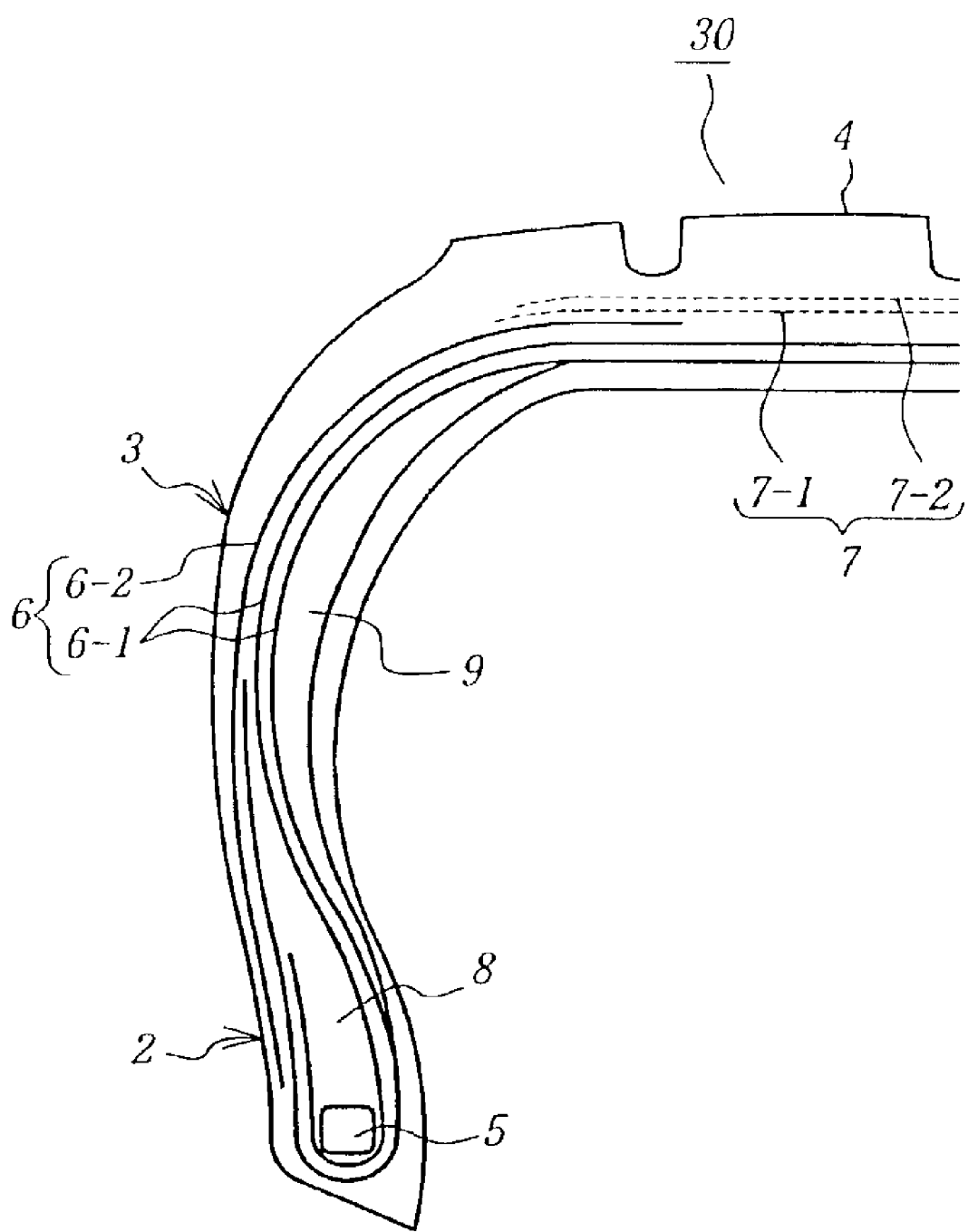
FIG. 22 is a diagrammatically left-half section view of an eighth embodiment of the pneumatic tire according to the invention.

In a tire 30 shown in FIG. 22, the carcass 6 is comprised of two turnup plies 6-1 and one down ply 6-2, wherein the down ply 6-2 is a split ply formed by separating off the ply in a zone of the crown portion beneath the belt 7 by 40% of a width of the steel cord layer 7-1 constituting the belt 7 inclusive of a central line thereof.

Figure 23:
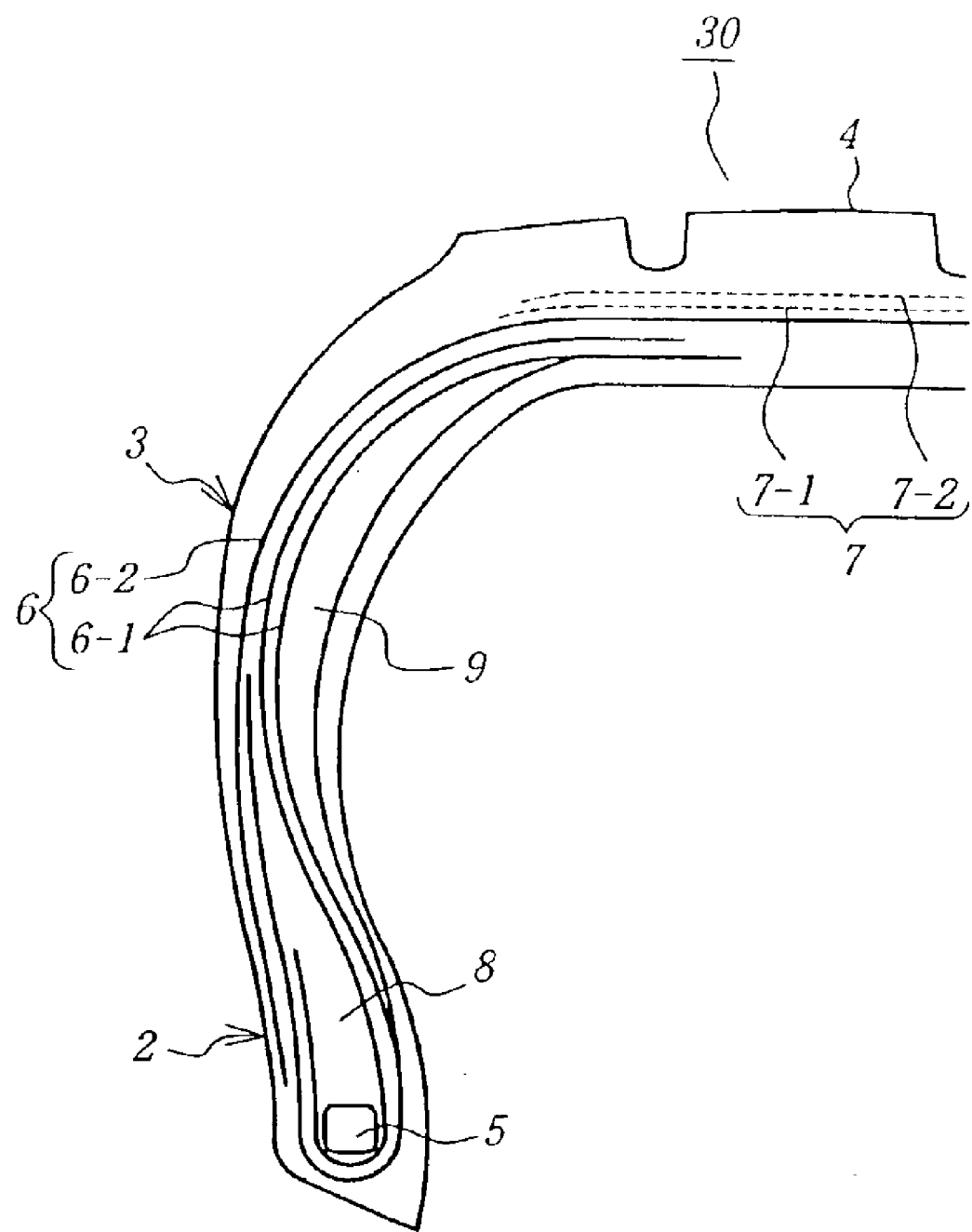
FIG. 23 is a diagrammatically left-half section view of a ninth embodiment of the pneumatic tire according to the invention.

In a tire 30 shown in FIG. 23, the carcass 6 is comprised of two turnup plies 6-1 and one down ply 6-2, wherein an innermost turnup ply 6-1 is a split ply formed by separating off the turnup ply in a zone of the crown portion beneath the belt 7 by 40% of a width of the steel cord layer 7-1 constituting the belt 7 inclusive of a central line thereof and an outermost turnup ply 6-1 is a split ply formed by separating off the turnup ply in a zone of the crown portion beneath the belt 7 by 60% of a width of the steel cord layer 7-1 constituting the belt 7 inclusive of a central line thereof.

Figure 24:
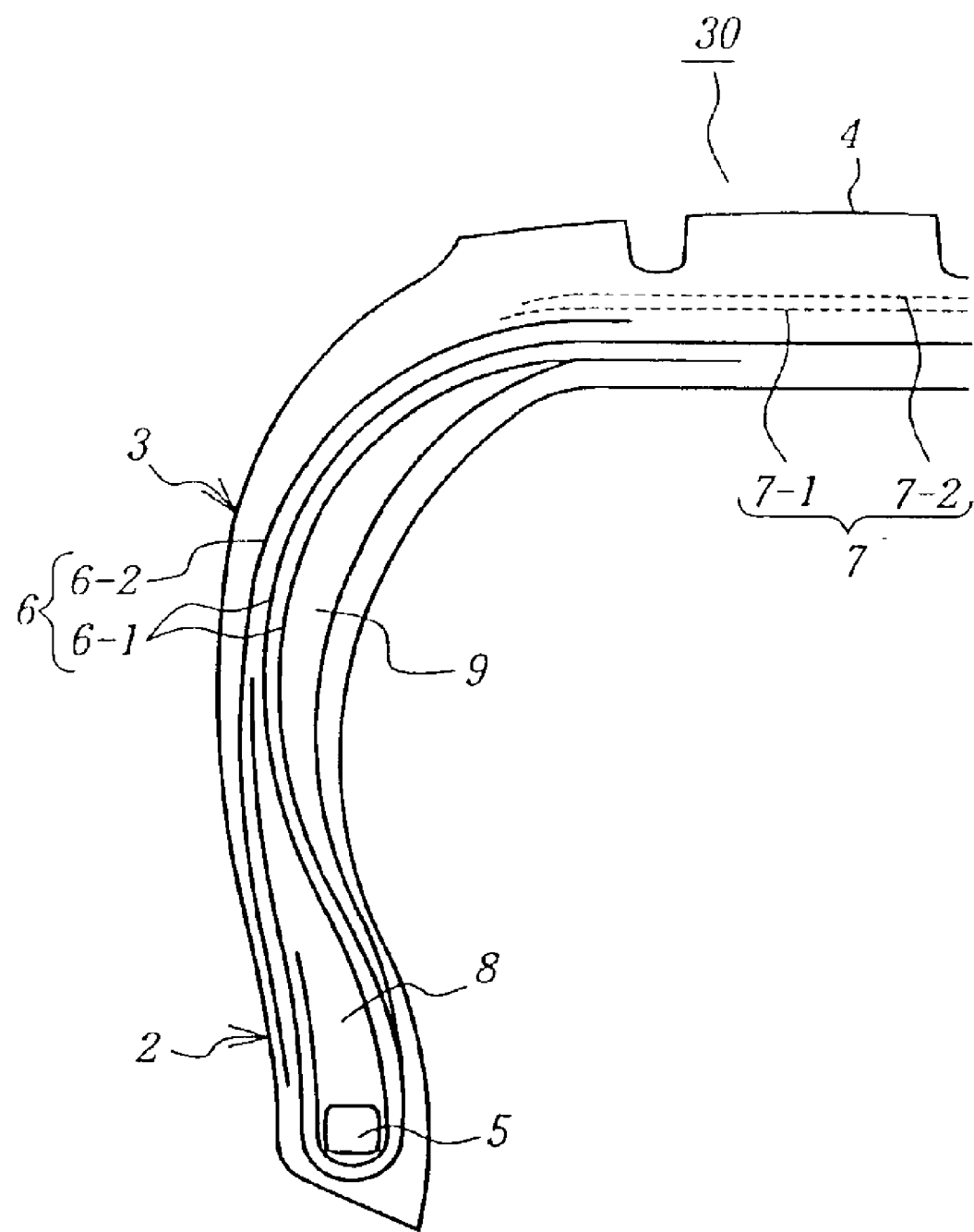
FIG. 24 is a diagrammatically left-half section view of a tenth embodiment of the pneumatic tire according to the invention.

In a tire 30 shown in FIG. 24, the carcass 6 is comprised of two turnup plies 6-1 and one down ply 6-2, wherein an innermost turnup ply 6-1 is a split ply formed by separating off the turnup ply in a zone of the crown portion beneath the belt 7 by 40% of a width of the steel cord layer 7-1 constituting the belt 7 inclusive of a central line thereof and the down ply 6-2 is a split ply formed by separating off the ply in a zone of the crown portion beneath the belt 7 by 60% of a width of the steel cord layer 7-1 constituting the belt 7 inclusive of a central line thereof.

Figure 25:
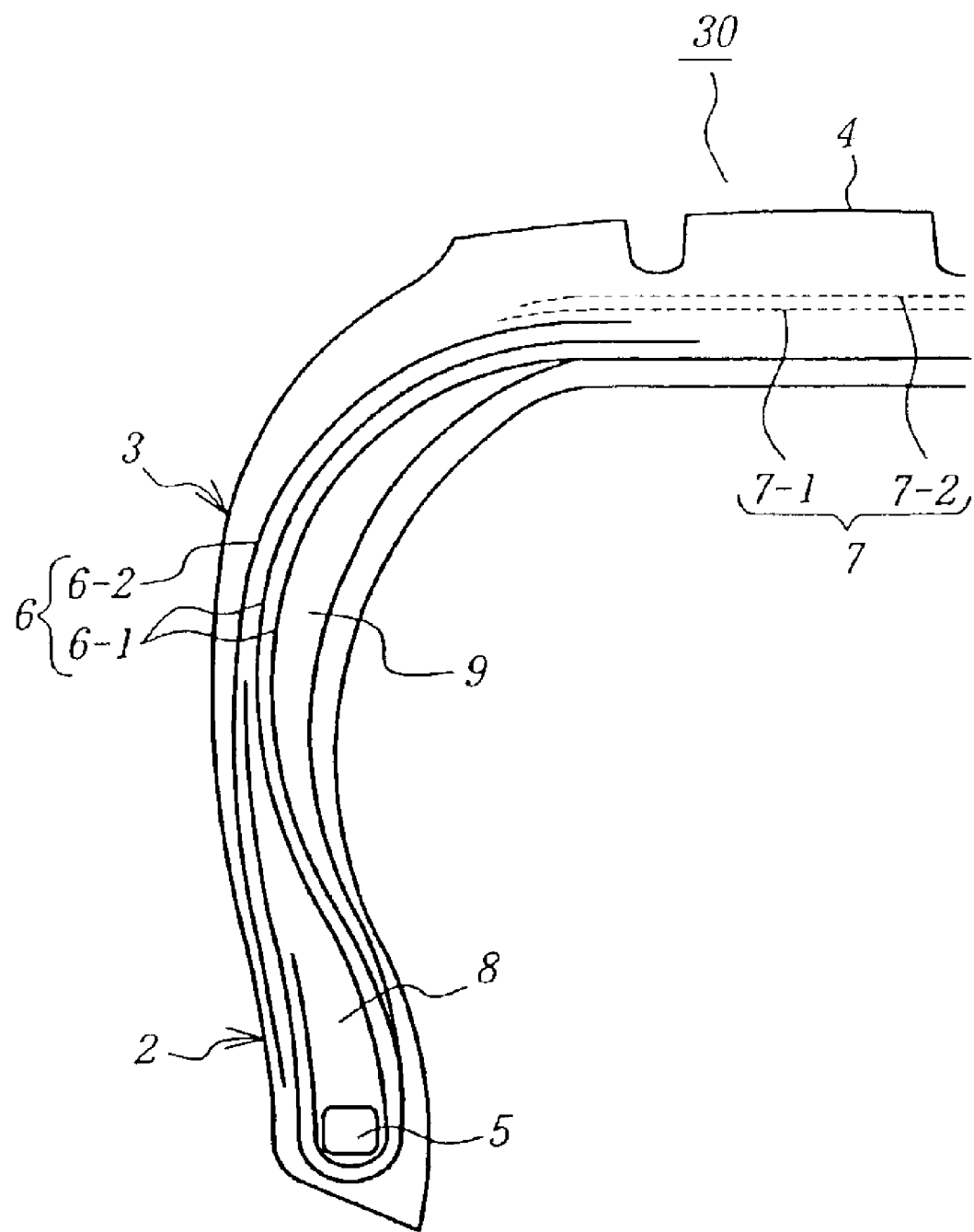
FIG. 25 is a diagrammatically left-half section view of an eleventh embodiment of the pneumatic tire according to the invention.

In a tire 30 shown in FIG. 25, the carcass 6 is comprised of two turnup plies 6-1 and one down ply 6-2, wherein an outermost turnup ply 6-1 is a split ply formed by separating off the turnup ply in a zone of the crown portion beneath the belt 7 by 40% of a width of the steel cord layer 7-1 constituting the belt 7 inclusive of a central line thereof and the down ply 6-2 is a split ply formed by separating off the ply in a zone of the crown portion beneath the belt 7 by 60% of a width of the steel cord layer 7-1 constituting the belt 7 inclusive of a central line thereof.

Figure 26:
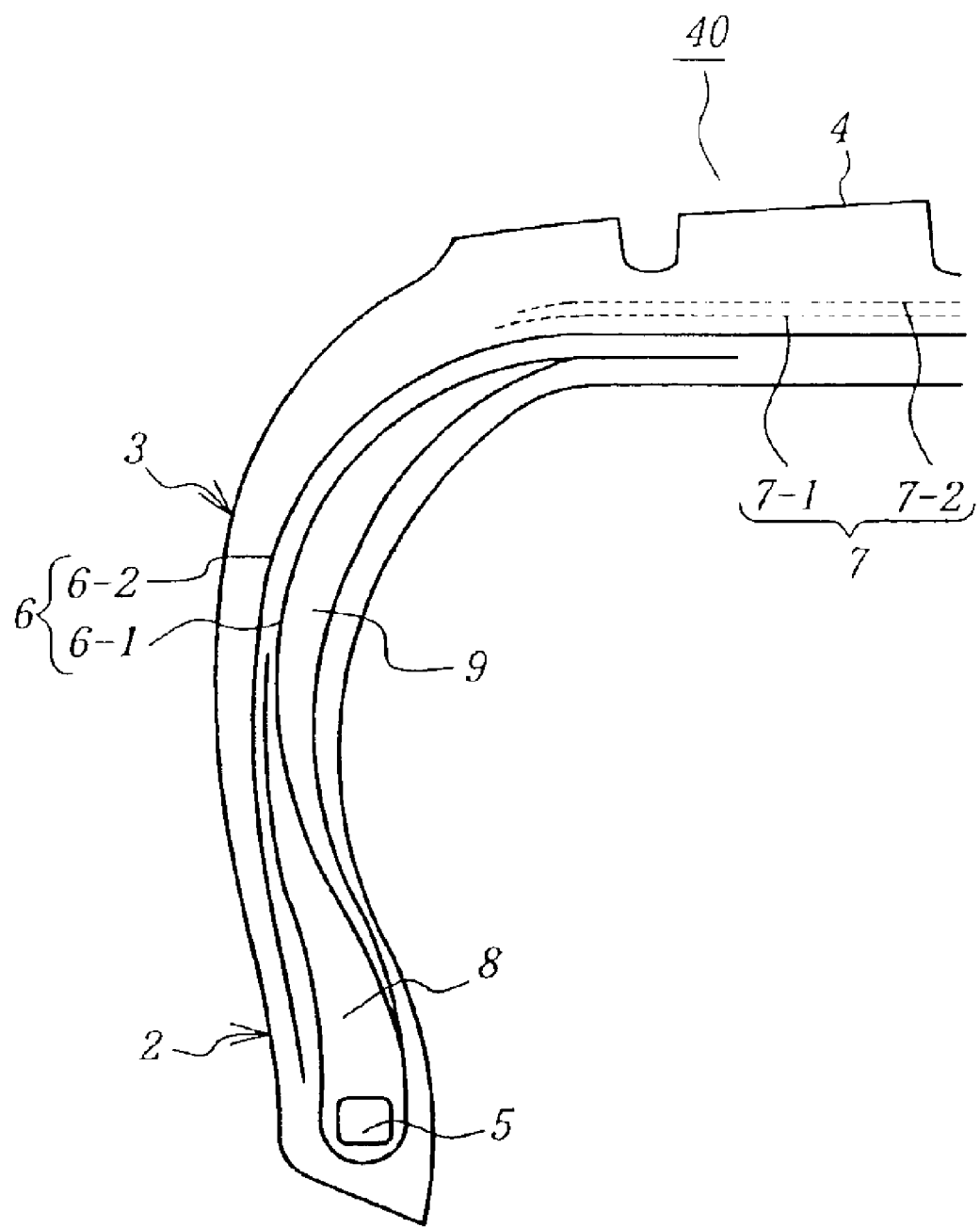
FIG. 26 is a diagrammatically left-half section view of a twelfth embodiment of the pneumatic tire according to the invention.

In a tire 30 shown in FIG. 26, the carcass 6 is comprised of one turnup ply 6-1 wound around the bead core 5 from an inside of the tire 30 toward an outside thereof to form a turnup portion and one down ply 6-2 extending between the mutual bead cores 5 to enclose the main body and the turnup portion of the turnup ply 6-1 from the outside thereof and having a terminal in the vicinity of the bead core 5, wherein the turnup ply 6-1 is a split ply formed by separating off the turnup ply in a zone of the crown portion beneath the belt 7 by 40% of a width of the steel cord layer 7-1 constituting the belt 7 inclusive of a central line thereof.

Figure 27:
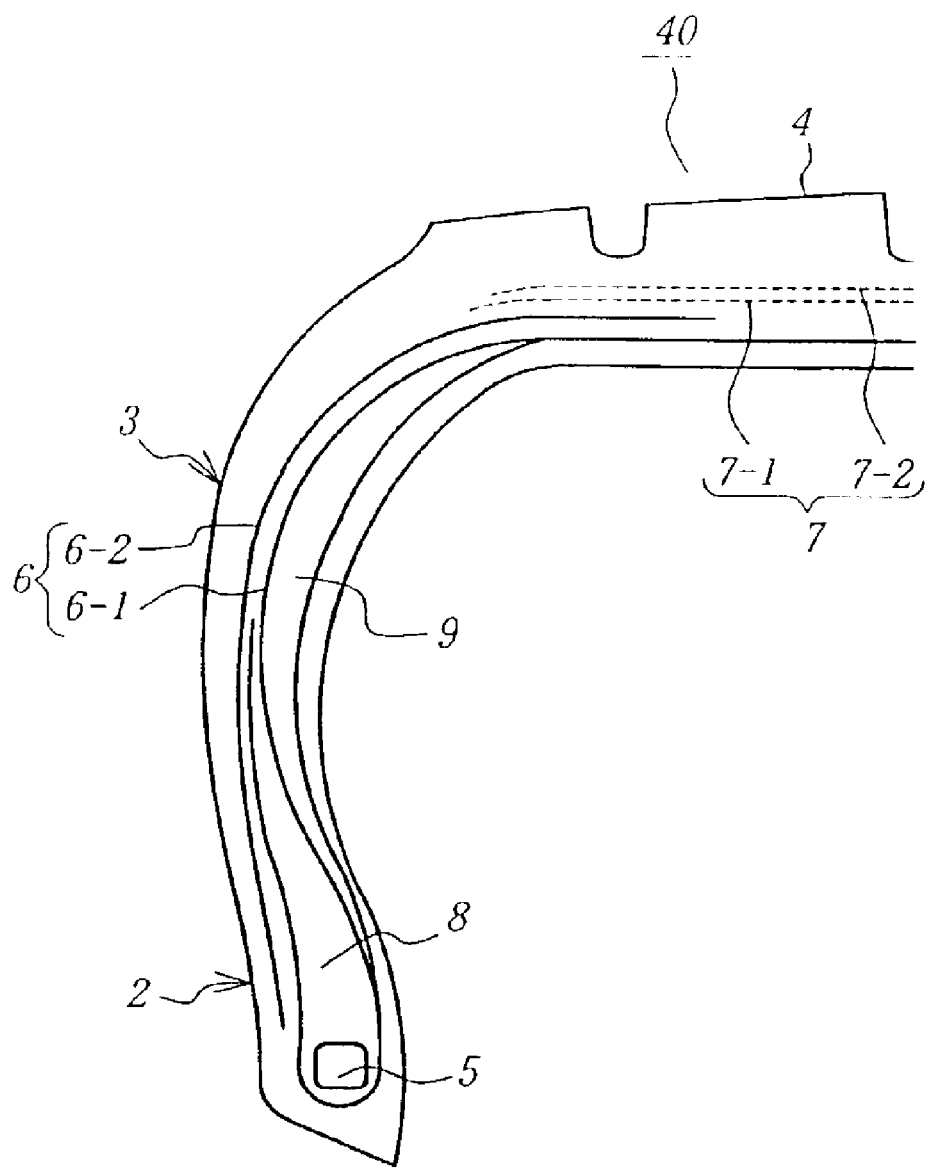
FIG. 27 is a diagrammatically left-half section view of a thirteenth embodiment of the pneumatic tire according to the invention.

In a tire 30 shown in FIG. 27, the carcass 6 is comprised of one turnup ply 6-1 and one down ply 6-1, wherein the down ply 6-2 is a split ply formed by separating off the turnup ply in a zone of the crown portion beneath the belt 7 by 40% of a width of the steel cord layer 7-1 constituting the belt 7 inclusive of a central line thereof.

The split ply as shown in FIGS. 20–27 has a split-off width corresponding to at least 20% of a maximum belt width, preferably a split-off width of 25-70%. In case of plural split plies, at least one split ply is favorable to contain cords of an organic fiber selected from rayon fiber, aromatic polyamide fiber, aliphatic polyamide fiber having a melting point of not lower than 250° C. as measured through DSC and polyester fiber therein.

In the tires according to the invention, rubber ingredient used in a coating rubber for ply cord of the carcass, the reinforcing rubber layer and the cushion rubber layer is not particularly restricted, but may include, for example, natural rubber (NR), butadiene rubber (BR), styrene-butadiene rubber (SBR) and synthetic isoprene rubber (IR).

The following examples are given in illustration of the invention and are not intended as limitations thereof.

EXAMPLES 1~39, COMPARATIVE EXAMPLE 1

There are prepared radial tires for passenger car having a tire size of 225/60R16 as tires of Examples 1~39. In this case, the carcass 6 is comprised of two turnup plies 6-1 and one down ply 6-2 and the other structure is according to FIGS. 1, 2 and 3~6, wherein all plies of the carcass 6 are rubberized plies of nylon-6,6 cords and the belt 7 is comprised of two rubberized steel cord cross layers 7-1, 7-2 and one cap ply 7-3 formed by spirally winding rubberized nylon-6,6 cord. A coating rubber for cords in each of the plies 6-1, 6-2 of the carcass 6 has tan δ of 0.16, and a coating rubber for cords in the cord cross layers 7-1, 7-2 of the belt 7 has tan δ of 0.15.

In order to evaluate the run flat durability of each example tire, there are provided a conventional tire and a tire of Comparative Example 1. In the conventional tire, a rubber layer corresponding to the cushion rubber layer 12 has tan δ of 0.16. In Tables 1 and 2 are shown tan δ of cushion rubber layer 11, 12, 13, 14, distances $d_1, d_2, d_3, d_4$ (mm) on vertical line $VL_1, VL_2$, widths $W_1, W_2, W_3, W_4$ (mm) and value of 50% modulus ration ($M_{50}C/M_{50}R$) {represented by $M_{50}$ ratio (%)} in each of these tires.

Each of the tires is assembled onto a recommended rim among approved rims (according to JATMA standard), and inflated under a sufficient air pressure to render the tire into use state and then the air pressure is returned to zero. Each tire rendered into run flat state is pushed onto a drum rotating at a surface speed of 89 km/h under a load of 570 kgf corresponding to 76% of a maximum load capacity to measure a running distance until the occurrence of trouble in the tire (run flat durability). The measured results are represented by an index on the basis that the conventional tire is 100 and shown in Tables 1 and 2. The larger the index value means the better the run flat durability.

TABLE 1

| Kind of tire | tan δ | Distance on vertical line $VL_1, VL_2$ (mm) | | | | Width of cushion rubber layer (mm) | | | | $M_{50}$ ratio (%) | Running distance on drum (index) |
|---|---|---|---|---|---|---|---|---|---|---|---|
| | | $d_1$ | $d_2$ | $d_3$ | $d_4$ | $W_1$ | $W_2$ | $W_3$ | $W_4$ | | |
| Conventional Example | 0.16 | — | 1.5 | — | — | — | 20 | — | — | 75 | 100 |
| Comparative Example | 0.16 | 2.0 | 2.0 | 2.0 | 2.0 | 30 | 30 | 30 | 30 | 75 | 100 |
| Example 1 | 0.10 | 2.0 | 2.0 | 2.0 | 2.0 | 30 | 30 | 30 | 30 | 75 | 115 |
| Example 2 | 0.07 | 2.0 | 2.0 | 2.0 | 2.0 | 30 | 30 | 30 | 30 | 75 | 145 |
| Example 3 | 0.04 | 2.0 | 2.0 | 2.0 | 2.0 | 30 | 30 | 30 | 30 | 75 | 172 |
| Example 4 | 0.02 | 2.0 | 2.0 | 2.0 | 2.0 | 30 | 30 | 30 | 30 | 75 | 180 |
| Example 5 | 0.07 | 0.5 | — | — | — | 30 | — | — | — | 75 | 103 |
| Example 6 | 0.07 | 1.2 | — | — | — | 30 | — | — | — | 75 | 107 |
| Example 7 | 0.07 | 2.0 | — | — | — | 30 | — | — | — | 75 | 110 |
| Example 8 | 0.07 | 3.0 | — | — | — | 30 | — | — | — | 75 | 110 |
| Example 9 | 0.07 | 2.0 | — | — | — | 11 | — | — | — | 75 | 105 |
| Example 10 | 0.07 | 2.0 | — | — | — | 25 | — | — | — | 75 | 109 |
| Example 11 | 0.07 | 2.0 | — | — | — | 44 | — | — | — | 75 | 110 |
| Example 12 | 0.07 | — | 1.0 | — | — | — | 30 | — | — | 75 | 112 |
| Example 13 | 0.07 | — | 1.0 | — | — | — | 30 | — | — | 100 | 102 |
| Example 14 | 0.07 | — | 1.0 | — | — | — | 30 | — | — | 60 | 134 |
| Example 15 | 0.07 | — | 1.0 | — | — | — | 30 | — | — | 44 | 135 |
| Example 16 | 0.07 | — | 3.0 | — | — | — | 30 | — | — | 75 | 134 |
| Example 17 | 0.07 | — | 4.3 | — | — | — | 30 | — | — | 75 | 144 |
| Example 18 | 0.07 | — | 5.8 | — | — | — | 30 | — | — | 75 | 148 |
| Example 19 | 0.07 | — | 7.0 | — | — | — | 30 | — | — | 75 | 148 |
| Example 20 | 0.07 | — | 2.0 | — | — | — | 12 | — | — | 75 | 108 |
| Example 21 | 0.07 | — | 2.0 | — | — | — | 20 | — | — | 75 | 128 |
| Example 22 | 0.07 | — | 2.0 | — | — | — | 36 | — | — | 75 | 144 |
| Example 23 | 0.07 | — | 2.0 | — | — | — | 48 | — | — | 75 | 148 |

TABLE 2

| Kind of tire | tan δ | Distance on vertical line $VL_1, VL_2$ (mm) | | | | Width of cushion rubber layer (mm) | | | | $M_{50}$ ratio (%) | Running distance on drum (index) |
|---|---|---|---|---|---|---|---|---|---|---|---|
| | | $d_1$ | $d_2$ | $d_3$ | $d_4$ | $W_1$ | $W_2$ | $W_3$ | $W_4$ | | |
| Example 24 | 0.07 | — | — | 0.5 | — | — | — | 30 | — | 75 | 105 |
| Example 25 | 0.07 | — | — | 1.2 | — | — | — | 30 | — | 75 | 112 |
| Example 26 | 0.07 | — | — | 2.0 | — | — | — | 30 | — | 75 | 116 |
| Example 27 | 0.07 | — | — | 3.0 | — | — | — | 30 | — | 75 | 116 |
| Example 28 | 0.07 | — | — | 2.0 | — | — | — | 11 | — | 75 | 107 |
| Example 29 | 0.07 | — | — | 2.0 | — | — | — | 25 | — | 75 | 115 |
| Example 30 | 0.07 | — | — | 2.0 | — | — | — | 44 | — | 75 | 116 |
| Example 31 | 0.07 | — | — | — | 0.5 | — | — | — | 30 | 75 | 105 |
| Example 32 | 0.07 | — | — | — | 1.4 | — | — | — | 30 | 75 | 128 |
| Example 33 | 0.07 | — | — | — | 2.0 | — | — | — | 30 | 75 | 137 |
| Example 34 | 0.07 | — | — | — | 3.0 | — | — | — | 30 | 75 | 140 |
| Example 35 | 0.07 | — | — | — | 2.0 | — | — | — | 8 | 75 | 103 |
| Example 36 | 0.07 | — | — | — | 2.0 | — | — | — | 20 | 75 | 124 |
| Example 37 | 0.07 | — | — | — | 2.0 | — | — | — | 34 | 75 | 136 |
| Example 38 | 0.07 | — | — | — | 2.0 | — | — | — | 44 | 75 | 140 |
| Example 39 | 0.07 | 0.3 | 1.2 | 0.3 | 1.0 | 30 | 40 | 30 | 40 | 75 | 180 |

As seen from the results of durability described in Tables 1 and 2, heat trouble of coating rubber for the down ply 6-2 in the region γ is caused in all of the tires of Examples 1~39, conventional tire and tire of Comparative Example 1. When the durability of each example tire is compared with that of the conventional tire, the running distance on drum increases as tan δ of the cushion rubber layer 11, 12, 13, 14 becomes smaller, and the running distance on drum increases as the width $W_1, W_2, W_3, W_4$ of the cushion rubber layer 11, 12, 13, 14 becomes wider at the same tan δ, and the running distance on drum increases as the value of the distance $d_1$, $d_2, d_3, d_4$ on the vertical line $VL_1, VL_2$ through the cushion rubber layer 11, 12, 13, 14 (or gauge of cushion rubber layer) becomes larger at the same tan δ and width $W_1, W_2, W_3, W_4$, which show that they are effective to dispersion and mitigation of shearing strain $γ_P$.

And also, it is apparent that the run flat durability exceeding that of the conventional tire can be obtained by using any one of the cushion rubber layers 11, 12, 13 and 14, while the use of two or more cushion rubber layers is more effective. In the example tires having an index value of the durability of more than 140, the trouble changes into cracking of the reinforcing rubber layer 9, which shows a limit of the effect of improving the run flat durability.

In the tire group of Examples 12~15 in Table 1, the value {$M_{50}$ ratio (%)} of 50% modulus ratio ($M_{50}C/M_{50}R$) is changed and the other structure and dimensions are the same as those in the tire of Example 12. When the running distance on drum (index) is compared among the tire group of Examples 12~15, the run flat durability slightly exceeding that of the conventional tire is indicated even in the tire of Example 13 wherein the $M_{50}$ ratio is 100%, while the tire of Example 15 wherein the $M_{50}$ ratio is 44% tends to fail to increase the run flat durability as expected as compared with the tire of Example 14 wherein the $M_{50}$ ratio is 60%, so that it is apparent that the restriction of the $M_{50}$ ratio (%) to an adequate range also contributes to the improvement of the run flat durability as shown in FIG. 18.

A relation between weight increase and running distance on drum in the example tires is shown in the following Table 3. The weight of the conventional tire is 15.5 kgf. As seen from Table 3, when the tire of Example 4 is compared with the tire of Example 39 in the use of all cushion rubber layers 11, 12, 13, 14 from a viewpoint of the increase of the weight, the increase of the tire weight can be stopped to minimum by properly thinning the value of the distance $d_1$, $d_2$, $d_3$, $d_4$ on the vertical line $VL_1$, $VL_2$ (gauge of cushion rubber layer).

TABLE 3

| Kind of tire | Weight increase (kgf) | Running distance on drum (index) |
| --- | --- | --- |
| Conventional Example | 0.00 | 100 |
| Example 4 | 0.94 | 180 |
| Example 7 | 0.20 | 110 |
| Example 23 | 0.22 | 148 |
| Example 26 | 0.20 | 116 |
| Example 38 | 0.33 | 140 |
| Example 39 | 0.32 | 180 |

The compounding recipe of rubber composition used in the cushion rubber layer of Conventional Example and Example 16 is shown in Table 4. The cushion rubber layer used in each example is prepared by standardizing the rubber composition of the conventional example and changing kinds of rubber ingredient, filler and the like to adjust tan δ and $M_{50}$.

TABLE 4

| | part by weight | |
| --- | --- | --- |
| | Conventional example | Example 16 |
| Natural rubber | 100 | 80 |
| BR *1 | 0 | 20 |
| Carbon black (HAF) | 45.0 | 0 |
| Carbon black (FEF) | 0 | 45.0 |
| Softener *2 | 10.0 | 0 |
| Stearic acid | 1.0 | 3.0 |
| Vulcanization accelerator *3 | 0.7 | 1.2 |
| Antioxidant *4 | 1.0 | 1.0 |
| Zinc white | 3.0 | 10.0 |
| Sulfur | 2.5 | 3.8 |
| 50% modulus (MPa) | 1.2 | 2.5 |

*1: butadiene rubber, BR01, made by JSR Corporation
*2: Koumolex 300, made by Nippon Petroleum Chemical Co., Ltd.
*3: Nocceler NS-F, made by Ohuchi Shinko Kagaku Kogyo Co., Ltd.
*4: Ozonone 6C, made by Seiko Kagaku Co., Ltd.

EXAMPLES 40~53, COMPARATIVE EXAMPLES 2~3

In this example, the melting point of fiber for the cord of the carcass ply through DSC is a peak temperature of a melting curve measured through DSC made by Dunlop under conditions that a temperature rising rate is 10° C./min and a sample weight is about 5 mg.

The tensile stress of rubber composition used in the reinforcing rubber layer, coating rubber for the cord of the carcass ply and the like is measured according to JIS K6301-1995.

The tensile strength and elongation at break of the cord of the carcass ply are measured according to JIS L1017-1983.

The tire performances are measured by the following methods.

(1) Ride Comfort Against Vibrations

A test tire adjusted to an internal pressure of 2.0 kg/cm² is trained on a drum having an outer diameter 2000 mm and provided on one place with a semi-circular iron projection having a radius of 5 mm at a speed of 80 km/h under a load of 570 kg for 20 minutes, and thereafter the internal pressure is readjsuted to 2.0 kg/cm² at a state of no load and then the speed is raised to 20 km/h to adjust the load to 570 kg. Thereafter, the speed is increased every 5 km/h and an average waveform of load change to a tire-fixed shaft in the riding over the projection is measured at each speed, from which p-p value is calculated.

A changing direction of shaft load in the riding over the projection at the tire-fixing shaft is a forward direction of the tire (longitudinal spring), and so-called longitudinal spring constant becomes maximum at a speed zone of 30~40 km/h. Therefore, the p-p value (kg) at such a speed zone is calculated to evaluate the ride comfort against vibrations.

Moreover, the ride comfort against vibrations of the test tire is determined according to the following equation 1 and represented by an index on the basis that Comparative Example 2 or 3 as a control tire is 100.

$$\text{Ride comfort of test tire against vibrations} = 100 + 100 \times \{(p-p)c - (p-p)t\}/(p-p)c \quad (1)$$

wherein {(p–p)c} is a p-p value of the control tire and {(p–p)t} is a p-p value of the test tire.

The larger the index value, the better the ride comfort against vibrations.

(2) Run Flat Durability

The run flat durability is evaluated by the same method as described in Example 1.

There are first prepared radial tires for passenger car having a tire size of 225/60R16 and various carcass structures as shown in FIGS. 1 and 19–27.

As the cushion rubber layer is used the rubber composition of Example 16 shown in Table 4, and compounding recipes of rubber compositions for the reinforcing rubber layer and the coating rubber for the cord of the carcass ply are shown in Tables 5 and 6.

TABLE 5

| Reinforcing rubber layer (part by weight) | |
| --- | --- |
| Natural rubber | 30.0 |
| Butadiene rubber *1 | 70.0 |
| Carbon black (FEF) | 60.0 |
| Spindle oil | 5.0 |
| Zinc white | 3.0 |
| Stearic acid | 1.0 |
| Antioxidant *2 | 2.0 |
| Vulcanization accelerator *3 | 3.5 |
| Sulfur | 5.0 |

$M_{50}$: 4.5 MPa
*1: BR01, made by JSR Corporation
*2: Noclac 6C, made by Ohuchi Shinko Kagaku Kogyo Co., Ltd.
*3: Nocceler NS, made by Ohuchi Shinko Kagaku Kogyo Co., Ltd.

TABLE 6

Coating rubber for cord of carcass ply (part by weight)

| | |
|---|---|
| natural rubber | 100.0 |
| Carbon black (HAF) | 40.0 |
| Spindle oil | 3.0 |
| Zinc white | 3.0 |
| Stearic acid | 1.0 |
| Antioxidant *1 | 1.0 |
| Vulcanization accelerator *2 | 0.8 |
| Sulfur | 2.5 |

$M_{50}$: 1.6 MPa
*1: Noclac 6C, made by Ohuchi Shinko Kagaku Kogyo Co., Ltd.
*2: Nocceler CZ, made by Ohuchi Shinko Kagaku Kogyo Co., Ltd.

Tires having the structure shown in FIGS. 24 and 27 are prepared by using nylon-6 cord (melting point: 218° C.), nylon-6,6 cord (melting point: 258° C.) and nylon-4,6 cord (melting point: 283° C.) as a cord for the carcass ply and the ride comfort against vibrations and rub flat durability thereof are evaluated. The results are shown in Table 7.

TABLE 7

| | Comparative Example 2 | Example 40 | Example 41 | Comparative Example 3 | Example 42 | Example 43 |
|---|---|---|---|---|---|---|
| Carcass structure | FIG. 24 | FIG. 24 | FIG. 24 | FIG. 27 | FIG. 27 | FIG. 27 |
| Kind of cord | nylon-6 | nylon-4,6 | nylon-6,6 | nylon-6 | nylon-4,6 | nylon-6,6 |
| Ride comfort against vibrations | 100 | 99 | 100 | 100 | 100 | 100 |
| Run flat durability | 100 | 230 | 205 | 100 | 190 | 150 |

As seen from Table 7, the run flat durability is largely improved in the tires of the invention as compared with the tires of Comparative examples 2 and 3 using nylon-6 having a melting point of not higher than 250° C. as a reinforcing cord.

Tires having 10 kinds of carcass structures shown in FIGS. 1 and 19 to 27 are prepared by using nylon-4,6 as a cord for the carcass ply and the ride comfort against vibrations and run flat durability are evaluated by the same method as mentioned above to obtain results as shown in Table 8. In this case, the tires of Examples 44 and 51 are control.

TABLE 8

| | Carcass structure | Ride comfort against vibrations | Run flat durability |
|---|---|---|---|
| Example 44 | FIG. 19 | 100 | 100 |
| Example 45 | FIG. 20 | 111 | 100 |
| Example 46 | FIG. 21 | 111 | 100 |
| Example 47 | FIG. 22 | 119 | 100 |
| Example 48 | FIG. 23 | 117 | 100 |
| Example 49 | FIG. 24 | 118 | 100 |
| Example 50 | FIG. 25 | 117 | 100 |
| Example 51 | FIG. 1 | 100 | 100 |
| Example 52 | FIG. 26 | 115 | 100 |
| Example 53 | FIG. 27 | 113 | 100 |

As seen from Table 8, the ride comfort against vibrations can largely be improved by separating off at least one carcass ply beneath the belt while maintaining the run flat durability of the tire.

Tires having 5 kinds of carcass structures shown in FIG. 1, FIG. 19, FIG. 20 and FIG. 27 are prepared by using nylon-6,6 cord, PET cord, PEN cord, rayon cord and aromatic polyamide fiber cord (Kevlar) as a cord for the carcass ply, and the ride comfort against vibrations and run flat durability are evaluated likewise the case of nylon-4,6. The results are shown in Tables 9~13. In this case, the tires of FIG. 1 and FIG. 19 are control.

TABLE 9

Nylon-6,6 cord

| Carcass structure | FIG. 19 | FIG. 20 | FIG. 22 | FIG. 1 | FIG. 27 |
|---|---|---|---|---|---|
| Ride comfort against vibrations | 100 | 111 | 118 | 100 | 114 |
| Run flat durability | 100 | 100 | 100 | 100 | 100 |

TABLE 10

PET cord

| Carcass structure | FIG. 19 | FIG. 20 | FIG. 22 | FIG. 1 | FIG. 27 |
|---|---|---|---|---|---|
| Ride comfort against vibrations | 100 | 108 | 115 | 100 | 111 |
| Run flat durability | 100 | 100 | 100 | 100 | 100 |

TABLE 11

PEN cord

| Carcass structure | FIG. 19 | FIG. 20 | FIG. 22 | FIG. 1 | FIG. 27 |
|---|---|---|---|---|---|
| Ride comfort against vibrations | 100 | 108 | 114 | 100 | 111 |
| Run flat durability | 100 | 100 | 100 | 100 | 100 |

TABLE 12

Rayon cord

| Carcass structure | FIG. 19 | FIG. 20 | FIG. 22 | FIG. 1 | FIG. 27 |
|---|---|---|---|---|---|
| Ride comfort against vibrations | 100 | 110 | 109 | 100 | 114 |
| Run flat durability | 100 | 100 | 100 | 100 | 100 |

TABLE 13

| | Kevlar cord | | | | |
|---|---|---|---|---|---|
| Carcass structure | FIG. 19 | FIG. 20 | FIG. 22 | FIG. 1 | FIG. 27 |
| Ride comfort against durability | 100 | 106 | 113 | 100 | 111 |
| Run flat durability | 100 | 100 | 100 | 100 | 100 |

As seen from Tables 9–13, even when the kind of the cord for the carcass cord is changed, the ride comfort against vibrations can largely be improved by separating off at least one carcass ply beneath the belt while maintaining the run flat durability of the tire.

12 tires having the carcass structures shown in FIGS. 19 and 22 are prepared by using nylon-6,6 cord, PET cord, PEN cord, nylon-4,6 cord, rayon cord and Kevlar cord as a cord for the carcass ply without using the cushion rubber layer, and the ride comfort against vibrations is evaluated by the same method as mentioned above to obtain results as shown in Table 14.

TABLE 14

| Carcass structure | FIG. 19 | FIG. 22 |
|---|---|---|
| Nylon-6,6 cord | 100 | 118 |
| PET cord | 100 | 118 |
| PEN cord | 100 | 115 |
| Nylon-4,6 cord | 100 | 119 |
| Rayon cord | 100 | 115 |
| Kevlar cord | 100 | 113 |

As seen from table 14, the ride comfort against vibrations can largely be improved by rendering the down ply into split ply irrespectively of the kind of the cord.

INDUSTRIAL APPLICABILITY

According to the invention, there can be provided pneumatic tires having an aspect ratio of not less than 60 which can stop slight cost rise and tire weight increase while well holding both rim assembling property and ride comfort against vibrations without using the core and damaging the tire productivity and guarantee safe running of vehicles such as passenger cars and the like even in the rapid air leakage through puncture or the like and enhance the performance of preventing separation off of the tire from the rim during the run flat running and the durability performance to a level satisfied by users. And also, the ride comfort against vibrations can largely be improved by rendering at least one carcass ply into split ply as a carcass structure.

What is claimed is:

1. A pneumatic tire comprising:
a carcass of one or more rubberized plies of radially arranged cords toroidally extending between a pair of bead cores embedded in respective bead portions and reinforcing a pair of sidewall portions and a tread portion, a belt of two or more steel cord cross layers disposed on an outer periphery of the carcass to reinforce the tread portion, and a run-flat reinforcing rubber layer arranged in at least a part of a zone ranging from a position near to the bead portion through the sidewall portion to a shoulder region of the tread portion, wherein the belt has end portions at both shoulder regions of the tread portion;
at least one cushion rubber layer is provided between mutually adjacent end portions of two of the at least two steel cord cross layers constituting the belt; and
the at least one cushion rubber layer has a loss tangent (tan δ) lower than a loss tangent of rubber for coating cords of the carcass.

2. A pneumatic tire according claim 1, wherein each cushion rubber layer has a width of 10–30 mm and is dividedly arranged at an equal width on both sides with respect to a normal line VL, drawn to an outermost carcass ply through an edge of a narrow-width steel cord layer.

3. A pneumatic tire according to claim 2, wherein a distance d. between steel cords of mutually adjacent steel cord cross layers as measured on the normal line VL, is within a rage of 0.5–2.0 mm.

4. A pneumatic tire according to claim 1, wherein each cushion rubber layer has a loss tangent of 0.02–0.10 under test conditions that a temperature is 25° C. an initial tensile load is 160 gf, a dynamic strain is 1.0% and a frequency is 52 Hz.

5. A pneumatic tire according to claim 1, wherein the cords in the carcass are organic fiber cords.

6. A pneumatic tire according to claim 1, wherein when the carcass is comprised of two or more plies, at least one ply contains cords of an organic fiber selected from rayon fiber, aromatic polyamide fiber, aliphatic polyamide fiber having a melting point of not lower than 250° C. as measured through differential scanning calorimetry (DSC) and polyester fiber.

7. A pneumatic tire according to claim 6, wherein the organic fiber cords are of aliphatic polyamide or polyester fiber, the aliphatic polyamide is nylon-6,6 or nylon-4.6, and the polyester is polyethylene terephthalate or polyethylene-2,6-naphthalate.

8. A pneumatic tire according to claim 1, wherein when the carcass is comprised of a turnup ply and a down ply, at least one ply is a split ply separated off in a zone beneath the belt.

9. A pneumatic tire according to claim 8, wherein the at least one split ply is the turnup ply.

10. A pneumatic tire according to claim 8, wherein the at least one split ply is the down ply.

11. A pneumatic tire according to claim 8, wherein the at least one split ply has a split-off width corresponding to at least 20% of a width of the belt.

12. A pneumatic tire according to claim 8, wherein when the carcass comprises plural split plies, at least one split ply contains cords of an organic fiber selected from rayon fiber, aromatic polyamide fiber, aliphatic polyamide fiber having a melting point of not lower than 250° C. as measured through differential scanning calorimetry (DSC) and polyester fiber.

13. A pneumatic tire according to claim 12, wherein the organic fiber cords are of aliphatic polyamide or polyester fiber, the aliphatic polyamide is nylon-6,6 or nylon-4.6, and the polyester is polyethylene terephthalate or polyethylene-2,6-naphthalate.

* * * * *